US010891535B1

(12) United States Patent
Mancuso

(10) Patent No.: US 10,891,535 B1
(45) Date of Patent: Jan. 12, 2021

(54) SECURE MULTI-SERVER STABILIZED DATA PACKET EXCHANGE SYSTEMS

(71) Applicant: NEXT LEVEL DERIVATIVES LLC, Garden City, NY (US)

(72) Inventor: Charles Mancuso, Myrtle Beach, SC (US)

(73) Assignee: NEXT LEVEL DERIVATIVES LLC, Garden City, NY (US)

( * ) Notice: Subject to any disclaimer, the term of this patent is extended or adjusted under 35 U.S.C. 154(b) by 578 days.

(21) Appl. No.: 15/409,203

(22) Filed: Jan. 18, 2017

Related U.S. Application Data

(63) Continuation-in-part of application No. 14/830,555, filed on Aug. 19, 2015.

(60) Provisional application No. 62/415,311, filed on Oct. 31, 2016, provisional application No. 62/039,393, filed on Aug. 19, 2014.

(51) Int. Cl.
| | | |
|---|---|---|
| *G06Q 40/04* | (2012.01) | |
| *G06Q 40/00* | (2012.01) | |
| *G06Q 40/06* | (2012.01) | |
| *G06N 3/04* | (2006.01) | |
| *H04L 29/06* | (2006.01) | |
| *H04L 9/14* | (2006.01) | |
| *H04L 9/30* | (2006.01) | |

(52) U.S. Cl.
CPC ............... *G06N 3/04* (2013.01); *H04L 9/14* (2013.01); *H04L 9/30* (2013.01); *H04L 63/0428* (2013.01)

(58) Field of Classification Search
CPC ......... G06Q 40/04; G06Q 40/00; G06Q 40/06
USPC .......................................................... 705/37
See application file for complete search history.

(56) References Cited

U.S. PATENT DOCUMENTS

| | | | |
|---|---|---|---|
| 7,698,192 B2 | 4/2010 | Kiron et al. | |
| 8,438,093 B1 | 5/2013 | Palmer | |
| 8,527,393 B2 | 9/2013 | Boudreault et al. | |
| 9,607,337 B2 * | 3/2017 | Amicangioli | G06Q 40/04 |
| 9,747,465 B2 | 8/2017 | Glenville et al. | |

(Continued)

OTHER PUBLICATIONS

Nasdaq U.S. DV01 Treasury Futures http://business.nasdaq.com/media/Nasdaq-DV01-Treasury-Futures-Contract-Specitications_tcm5044-63486.pdf (accessed Jul. 18, 2018).
Nasdaq Launches U.S. Treasury Futures Product—NASDAQ.com https://www.nasdaq.com/press-release/nasdaq-launches-us-treasury-futures-product-20180702-00882 (accessed Jul. 18, 2018).
U.S. 10-YR DV01 Treasury Futures (TYDX) http://business.nasdaq.com/media/US-DV01-Treasury-Futures_tcm5044-63486.pdf (accessed Jul. 18, 2018).

(Continued)

*Primary Examiner* — Hai Tran
(74) *Attorney, Agent, or Firm* — Cooley LLP

(57) ABSTRACT

The SECURE MULTI-SERVER STABILIZED DATA PACKET EXCHANGE SYSTEMS (IRFI) provide efficient, secure data communication for data communication and exchange servers. The IRFI provides increased data exchange system security and efficiency for time-rate based data package communicators. The IRFI can use artificial neural networks that include three or more layers, with at least one input layer, a hidden layer and an output layer. The IRFI can obtain listing data relating to a data package, obtain characteristic parameters associated with the data package, determine a BP metric for the data package, calculate an exposure offset value based on the BP metric for the data package, receive evaluation data from an data packet exchange system, including a SY metric and a DV metric, calculate a delivery metric for the data package based on the evaluation data, and facilitate a communication of the delivery metric.

16 Claims, 13 Drawing Sheets

(56) References Cited

U.S. PATENT DOCUMENTS

| | | | |
|---|---|---|---|
| 9,747,641 | B2 | 8/2017 | Wilson, Jr. et al. |
| 9,767,310 | B2 | 9/2017 | Glenville et al. |
| 9,911,157 | B2 | 3/2018 | Johnston et al. |
| 9,965,804 | B1 | 5/2018 | Winklevoss et al. |
| 9,984,535 | B2 | 5/2018 | Odom |
| 10,002,388 | B2 | 6/2018 | Farnstrom |
| 10,007,950 | B2 | 6/2018 | Bridy et al. |
| 2002/0052795 | A1 | 5/2002 | Dines et al. |
| 2004/0225536 | A1 | 11/2004 | Schoen et al. |
| 2006/0277014 | A1 | 12/2006 | Loder et al. |
| 2007/0162367 | A1 | 7/2007 | Smith et al. |
| 2007/0219893 | A1 | 9/2007 | Xu |
| 2010/0268632 | A1* | 10/2010 | Rosenthal ............ G06Q 40/04 705/37 |
| 2012/0011054 | A1* | 1/2012 | Grody ................ G06Q 40/00 705/37 |
| 2013/0018769 | A1 | 1/2013 | Boudreault et al. |
| 2015/0026028 | A1 | 1/2015 | Davies et al. |
| 2015/0379643 | A1 | 12/2015 | Boberski et al. |
| 2018/0033083 | A1 | 2/2018 | Kirby et al. |
| 2018/0068390 | A1 | 3/2018 | Wilson, Jr. et al. |

OTHER PUBLICATIONS

Futures Trader Alert #2018—13 Initial Listing & Margin Notice for U.S. DV01 Treasury Futures Contract for Trade Date Jul. 19, 2018 + OCC Sample SPAN File Available; Monday, Jul. 2, 2018 https://www.nasdaqtrader.com/MicroNews.aspx?id=FTA2018-13 (accessed Jul. 18, 2018).

Anonymous, "Effecitve use of fixed-income pricing models," Bank Systems & Technology, v. 33, No. 8, p. 20, Aug. 1996, 2 pages.

Lavine, A., "VAs Aim to Hedge Against Interest Rate Risk," Annuity Market News, Jul. 1, 2004, 2 pages.

NPL Search Results for U.S. Appl. No. 14/830,555, dated Sep. 30, 2018 by EIC (2018), 19 pages.

Markham, J. W., "Regulating the U.S. Treasury Market," Marquette Law Review, vol. 100, Issue 1, Fall 2016; http://scholarship.law.marquette.edu/mulr/vol100/iss1/5.

Securities and Exchange Commission (Release No. 34-79116; File No. SR-FINRA-2016-027), Oct. 18, 2016, 40 pages; https://www.sec.gov/rules/sro/finra/2016/34-79116.pdf.

When-Issued U.S. Treasury Securties Futures Contracts, Proposed Contract Rules, 12 pp.; https://www.cftc.gov/sites/default/files/files/foia/comment01/foicf0101b001.pdf.

* cited by examiner

SECURE MULTI-SERVER STABILIZED DATA PACKET EXCHANGE SYSTEMS

This application claims priority to and benefit of U.S. provisional application No. 62/415,311, entitled SECURE MULTI-SERVER STABILIZED DATA PACKET EXCHANGE SYSTEMS, filed Oct. 31, 2016; this application is a continuation in part of U.S. application Ser. No. 14/830,555, filed Aug. 19, 2015, which claims priority to and benefit of U.S. provisional application no. 62/039,393, filed Aug. 19, 2014. The entire contents of the aforementioned applications are expressly incorporated by reference herein for all purposes.

This application for letters patent discloses and describes various novel innovations and inventive aspects of SECURE MULTI-SERVER STABILIZED DATA PACKET EXCHANGE SYSTEMS and related technologies (hereinafter collectively "IRFI") and contains material that is subject to copyright, mask work, and/or other intellectual property protection. The owner of such intellectual property has no objection to the facsimile reproduction of the disclosure by anyone as it appears in published Patent Office file/records, but otherwise reserves all rights.

FIELD

The present innovations generally address apparatuses, methods, and systems for data and database management, and data packet generation and communication, exchange, and oversight, and more particularly, include SECURE MULTI-SERVER STABILIZED DATA PACKET EXCHANGE SYSTEMS.

BACKGROUND

A variety of data protection, data authentication and data security are available. Encryption is a process of encoding messages or information in such a way that only authorized parties can access it. Maintaining data security is important to a variety of industries.

SUMMARY

This disclosure relates to apparatuses, methods, and systems for secure multi-server stabilized data packet exchange, including securing and validating multi-server electronic communications and data exchanges over a plurality of networks. In one embodiment, the disclosure provides a method for enhanced communication system security and increased processor efficiency across a multi-server data exchange system that provides validated IBI communications and data exchanges, comprising instantiating a data exchanger on a first computer server and receiving an encrypted identifier of a data packet at the first computer server over a secure communication network from a second computer server, the encrypted identifier having been encrypted at the second computer server. Then the first computer server decrypts the encrypted identifier to determine a plurality of data packet parameters associated with the data packet, and securely receives a specified data packet quantity string from the second computer server, he specified data packet quantity string being associated with a BP value of the data packet. Then, an offset value is calculated (e.g., via an artificial neural network) based on the BP value of the data packet and the specified data packet quantity string to correspond to an EV in a data exchange. The first computer server receives a PV string over a secure network from a further (e.g., third) computer server associated with a data exchange system, the PV string having a SY value and a DP value. A DQ is calculated for the data packet (e.g., via artificial neural network) based on the received PV string. Then, a secure exchange of the DQ is enabled/facilitated, the data packet exchanged based on FE units or DV of a BP without a fixed NV such that actual quantity of a data packet exchanged corresponds to the FE units. In some embodiments, the disclosure provides for a non-transitory medium storing computer-readable and executable instructions to perform the disclosed methods.

According to some embodiments of the disclosure, a secure, high-efficiency multi-server data packet communication, exchange, and validation apparatus is provided, the apparatus comprising: a plurality of processors; a calculator subcomponent including an artificial neural network, the artificial neural network having at least three layers, the at least three layers including at least one input layer configured to receive one or more data packet indicia, a hidden layer configured to map the one or more data packet indicia received through the input layer via one or more nonlinear functions, and an output layer; and a memory in communication with the plurality of processors and calculator subcomponent, the memory storing processor-readable instructions, the processor-readable instructions being executable to: instantiate a data exchange platform; receive an encrypted secure data packet selection; decrypting the encrypted secure data packet selection, the decrypted secure data packet selection including a plurality of data packet parameters; receive a data packet exchange quantity string associated with a data packet BP metric; calculate, via the calculator subcomponent, an offset metric based on the data packet BP metric and the data packet quantity string to correspond to an EV in a data exchange; receive a PV string from a data exchange system the PV string including a SY metric and DP metric; calculate via the calculator subcomponent, a data packet DQ based on the PV string; and execute a secure exchange of the DQ.

According to some embodiments of the disclosure, a secure, high-efficiency multi-server data packet communication, validation, and exchange apparatus, is provided, the apparatus comprising: a plurality of processors; a memory in communication with the plurality of processors and storing processor-readable instructions, the processor-readable instructions being executable by the plurality of processors to: instantiate a data exchange platform; receive a secure data packet selection the secure data packet selection including a plurality of data packet parameters; receive a data packet quantity string to exchange associated with a data packet BP metric; calculate an offset metric based on the data packet BP metric and the data packet quantity string to correspond to an EV in a data exchange; receive a PV string from a data exchange system the PV string including a SY metric and DP metric; calculate a data packet DQ based on the PV string; and execute a secure exchange of the DQ.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

Figure 1A:
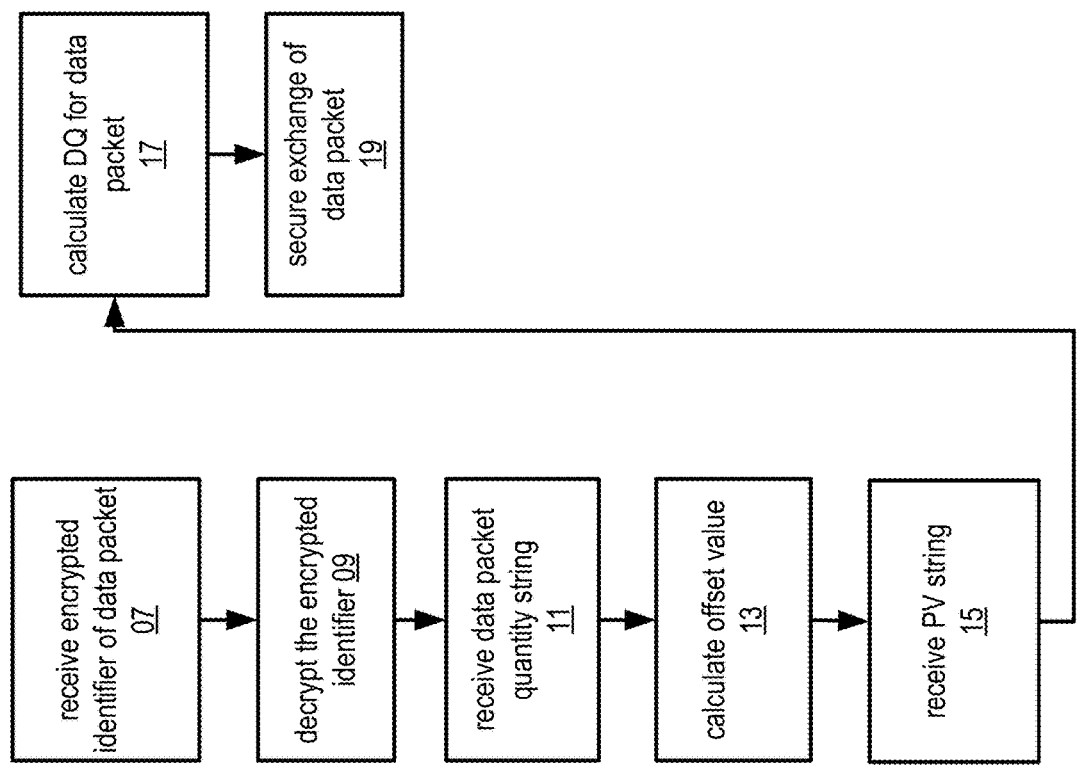
FIG. 1A is a flowchart illustrating an embodiment of disclosure.

The leading number of each reference number within the drawings typically indicates the figure in which that reference number is introduced and/or detailed. As such, a detailed discussion of reference number 101 would typically be found and/or introduced in FIG. 1. Reference number 201 is introduced in FIG. 2, etc.

DETAILED DESCRIPTION

The SECURE MULTI-SERVER STABILIZED DATA PACKET EXCHANGE SYSTEMS technology (hereinafter collectively "IRFI") provides a secure, efficient platform to construct and manage data packets or data packages. According to some embodiments of the disclosure, a secure, high-efficiency multi-server data packet communication, exchange, and validation apparatus is provided, the apparatus comprising: a plurality of processors; a calculator subcomponent including an artificial neural network, the artificial neural network having at least three layers, the at least three layers including at least one input layer configured to receive one or more data packet indicia, a hidden layer configured to map the one or more data packet indicia received through the input layer via one or more nonlinear functions, and an output layer; and a memory in communication with the plurality of processors and calculator subcomponent, the memory storing processor-readable instructions, the processor-readable instructions being executable to: instantiate a data exchange platform; receive an encrypted secure data packet selection; decrypting the encrypted secure data packet selection, the decrypted secure data packet selection including a plurality of data packet parameters; receive a data packet exchange quantity string associated with a data packet BP metric; calculate, via the calculator subcomponent, an offset metric based on the data packet BP metric and the data packet quantity string to correspond to an EV in a data exchange; receive a PV string from a data exchange system the PV string including a SY metric and DP metric; calculate via the calculator subcomponent, a data packet DQ based on the PV string; and execute a secure exchange of the DQ.

According to some embodiments of the disclosure, a secure, high-efficiency multi-server data packet communication, validation, and exchange apparatus, is provided, the apparatus comprising: a plurality of processors; a memory in communication with the plurality of processors and storing processor-readable instructions, the processor-readable instructions being executable by the plurality of processors to: instantiate a data exchange platform; receive a secure data packet selection the secure data packet selection including a plurality of data packet parameters; receive a data packet quantity string to exchange associated with a data packet BP metric; calculate an offset metric based on the data packet BP metric and the data packet quantity string to correspond to an EV in a data exchange; receive a PV string from a data exchange system the PV string including a SY metric and DP metric; calculate a data packet DQ based on the PV string; and execute a secure exchange of the DQ.

In some embodiment of the disclosure, method for enhanced communication system security and increased processor efficiency across a multi-server data exchange system that provides validated IBI communications and data exchanges is provided. For example, as illustrated in FIG. 1A, one such method comprises instantiating a data exchanger on a first computer server and receiving an encrypted identifier of a data packet (07) at the first computer server over a secure communication network from a second computer server, the encrypted identifier having been encrypted at the second computer server. Then the first computer server decrypts the encrypted identifier (09) to determine a plurality of data packet parameters associated with the data packet, and securely receives a specified data packet quantity string (11) from the second computer server, the specified data packet quantity string being associated with a BP value of the data packet. Then, an offset value is calculated (13) (e.g., via an artificial neural network) based on the BP value of the data packet and the specified data packet quantity string to correspond to an EV in a data exchange. The first computer server receives a PV string (15) over a secure network from a further (e.g., third) computer server associated with a data exchange system, the PV string having a SY value and a DP value. A DQ is calculated (17) for the data packet (e.g., via artificial neural network) based on the received PV string. Then, a secure exchange of the DQ (19) is enabled/facilitated, the data packet exchanged based on FE units or DV of a BP without a fixed NV such that actual quantity of a data packet exchanged corresponds to the FE units. In some embodiments, the disclosure provides for a non-transitory medium storing computer-readable and executable instructions to perform the disclosed methods.

To facilitate understanding, data packets and data packages are discussed in particular embodiments and implementations. While not limited to any particular disclosed embodiment, the disclosure addresses data packages that represent time-based exposure data packages that comply with IAS 32 and 39, such as IRFI interest rate based risk future contracts, that are communicated and exchanged (e.g., traded), and where the quantity delivered is uniquely determined by a exposure value (e.g., risk value) at settlement of the underlier (e.g., underlying bond or swap), instead of a fixed notional value. In some embodiments, the IRFI utilizes an artificial neural network that includes three or more layers, with at least one input layer, a hidden layer and an output layer. The IRFI also facilitates efficient transactions. This application is a continuation-in-part of U.S. patent application Ser. No. 14/830,555, filed Aug. 19, 2015, which in turn claims the benefit of U.S. Provisional Patent Application No. 62/039,393, filed Aug. 19, 2014; the entire contents of the aforementioned applications are expressly incorporated by reference herein in their entirety for all purposes. This application also claims priority to and the benefit of U.S. Provisional Application No. 62/415,311, entitled "Secure Multi-Server Stabilized Data Packet Exchange Systems," filed Oct. 31, 2016, the disclosure of which is incorporated herein by reference in its entirety, The Financial Reform Act has allowed standardized Interest Rate Swaps to be traded and transacted on an exchange or on a Swap Execution Facility (SEF). Either format can be utilized for these inventions. The IRFI data package set has the capability to be traded on current existing infrastructure in rate without the need to set a notional value or coupon.

In one implementation, the IRFI provides data package or data packet than can embody or represent a financial instrument in a format similar to an interest rate risk or interest rate exposure future, which allows for data packages (e.g., contracts) to trade in round units of forward risk or forward exposure (herein "risk unit size"), or Dollar Value of an 01 (DV01). The quantity delivered may be uniquely determined by the exposure value at expiration of the underlier (e.g., underlying bond or swap), instead of a fixed notional value. Round standardized units of exposure can make the data package efficient to use for offsetting, executing curve trades or spreading versus cash data packages. The exposure management of such IRFI data packages can be transparent and thus provide value to the systems in which they are exchanged, as well as the regulators/controllers of those systems. In this way, for example, relationships in futures can be quoted in yield terms and OTC market conventions, rather than complex basis ratios or dollar spreads. For example, initially the IRFI data packages may include swap interest rate based data packages, and/or treasury interest rate based data packages.

For example, all listed futures contracts can specify an amount of the underlying product traded, e.g., wheat trades in bushels, gold trades in oz and bonds trade in notional value. The IRFI contract allows trading in rates data packages without trading a specific or pre-determined notional size. By transacting units of forward exposure or dollar value of a basis point or risk unit sizes without specifying a fixed quantity, rates data packages can be traded and/or be quoted in yield utilizing existing futures infrastructure while maintaining the true economics and convexity of the underlying cash or over the counter (OTC) markets. In this way, the IRFI contact can avoid the convexity dilemma as the trades do not need a fixed quantity. The IRFI contract allows option strike prices to be quoted in yield. While Eurodollars and options share this quoting methodology, they may suffer from a convexity issue as the tick value and quantity are both held constant. Other products that assign a coupon are forced to in prices and these prices could have little resemblance to the underlying market at expiration. Thus newer products would require additional support and infrastructure.

In another example, the round exposure units per basis point allow simplified offsetting and exposure management. Since the contracts are based in exposure per basis point, the value at exposure, is precisely the volatility in basis points multiplied by the number of contracts times the exposure unit ($100). These round units make profit and loss calculations more straightforward and more transparent.

In another example, settlement can be determined by the corresponding Treasury Auction, instead of the price of the futures traded. In this way, the IRFI may force full convergence to the Treasury Market, eliminating manipulation and will support and enhance liquidity and transparency of the Treasury Market.

In another example, by quoting data packages in yield, relationships or spreads can be quoted in simple yield differentials. Currently cash and futures are quoted in price spreads using awkward hedge ratios while the underlying markets are all yield quotes. For example, current listed futures products have different quoting conventions and tic values making spread exchange complex. A simple curve trade in the OTC market 2 yr-10 yr would be quoted in yield however the equivalent in treasury basket futures requires executing a fixed dollar spread. Since the tic values of the contracts differ and the weightings are often awkward, one must wait for prices to align in order to achieve the desired theoretical forward yield spread. The IRFI spreads are round simple ratios and allow for straightforward execution of yield curve trades.

In further examples, the IRFI can provide a exchange structure with increasing transparency and liquidity in the marketplace simplified settlement and increased liquidity in options with longer expirations.

For example, the $600 Trillion OTC Derivatives Market may be influenced by the implementation of the Dodd-Frank financial reform bill, and such regulations is a mandate for exchange standardized Swaps to take place on exchanges or on SEFs. For smaller firms, implementation of exchange may suffer due to a lack of infrastructure and reluctance to spend limited technology budgets on various unproven SEF platforms. In addition, increased capital requirements for banks may further add to costs. The Listed Futures Market has an existing infrastructure and may provide an efficient exchange platform for centrally cleared OTC derivatives, but the existing product set is complex and embedded with hidden convexity exposures. In one implementation, the IRFI may provide a cost effective format for generating, trading, and/or managing forward rates and long term options.

In one implementation, swap and bond convexity pose a hurdle to creating a successful listed futures product. For example, as bond prices move higher, the sensitivity to changes in yields increase; and as bond prices move lower, the sensitivity decreases. Settlement systems may not be dynamic and often may only handle products traded in price or a fixed tick value for products traded in yield. Eurodollars futures may be an example of holding the tick value constant. The application of Eurodollars futures can be limited. Once contracts have expirations over one or two years, the lack of discounting makes offsetting extremely tedious and liquidity suffers. Thus, a to year swap may require forty contracts executed simultaneously at different prices and in decreasing quantities to adjust for the lack of convexity.

Other workarounds could have designated a fixed coupon. The problem with a fixed coupon is that as rates fluctuate the "couponed security's" market prices do not resemble the underlying OTC product that they are trying to replicate, making trading options even more difficult.

In another example, the IRFI data packages are easy to price. For example, data packages such as basket options require complex models and massive convexity adjustment since the underliers may sometimes change. Most models must consider the level of rates, shape of the curve, and repo financing to simultaneously price all issues in the basket. The IRFI can eliminate this hedging adjustment since the forward exposure is constant when exchanging outrights or IRFI spreads. Thus price can be expressed simply as 100-yield making calculations simple, straightforward, and computationally less expensive.

In another example, IRFI data packages can ensure certainty in delivery. Delivery of IRFI data packages can be based on existing benchmarks and infrastructure. Currently, delivery of contracts is uncertain since Cheapest to Deliver (CTD) bonds could change and duration of the contracts could move by years. Further, massive tails could create outright risks. In addition, early deliveries tend to be disruptive and bonds must be placed in safekeeping for delivery. The elegant and straightforward methodology utilized by IRFI ensures that there is no change in duration of contracts, no early deliveries and no tail risk involved. The IRFI can also eliminate the need for safekeeping.

In further examples, the IRFI allows for easy hedging and option trading. Since data packages are quoted in logical yields instead of dollar prices, IRFI contracts such as options can trade way out in the future and the break evens can be calculated easily.

The IRFI may allow multiple standardized forward expirations on liquid benchmark tenors to be traded on treasury bonds prior to a coupon being determined. The yield points for benchmark tenors such as 2 year, 5 year, 7 year, 10 year, and 30 year can be interpolated via bootstrapping or other models to create a smooth risk free Treasury forward curve. Thus, the IRFI may provide an alternative to unstable reference rates such as LIBOR. Additionally, the risk free Treasury forward curve may eliminate the need to assume coupons therefore eliminating cancellations or corrections which often creates settlement risks and confusion on the FED Wire Settlement System.

For example, if the yield was believed to be 2% then the price of the IRFI contract would simply be 98.00. If the exposure on a ten year IRFI contract is set at $100 then every tick is a $100 in profit or loss.

In one implementation, the IRFI can provide better Exchange-Traded Funds (ETFs). For example, 20+ Year Treasury Bond (TLT) is a basket of bonds that could include proxy issues and surrogates. These bonds have different coupons, different floating supply, and different maturities. The holdings are in percentage terms and must be weighted proportionately. TLT are interpolated from the benchmark rates and a model is used to determine the curve. However, the IRFI can allow futures based on liquid single points on the curve rather than on the underlying cost of TLT. Thus, IRFI may eliminate multiple interpolations.

In one implementation, the IRFI can offer financial instruments and infrastructure to trade treasuries several months and/or years in advance. Treasuries are traded in spot market or briefly during WI period (e.g., from announcement to auction). The IRFI can go beyond inferences from a spot market with poor illiquid financing to produce a true forward tradeable point in the curve.

In one implementation, the IRFI constructs an innovative product suite offering end users true OTC economics utilizing an existing infrastructure of a trading firm. The IRFI data package may include a fixed income futures data package set that improves the convexity situation, which enables rates products to be traded in yield over existing futures infrastructure while maintaining the true economics of the underlying OTC market. The IRFI may allow for contracts to trade where the quantity delivered is uniquely determined by the exposure value at settlement of the underlying bond or swap, not a fixed notional value.

Figure 1B:
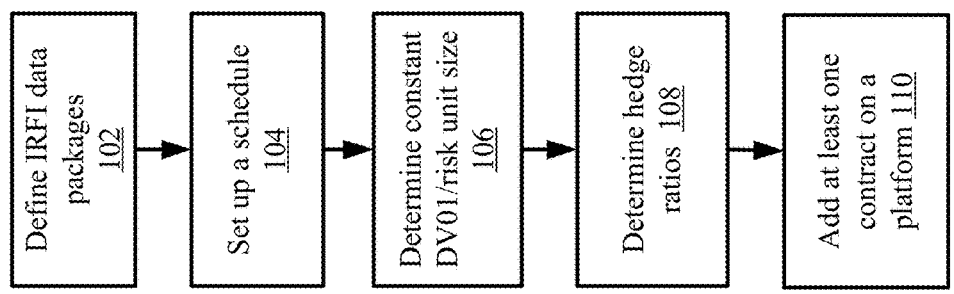
FIG. 1B is a flowchart illustrating development of IRFI data packets in accordance with some embodiments of IRFI.

FIG. 1B is a flowchart illustrating development of IRFI data packages in accordance with some embodiments of IRFI. As shown in FIG. 1B, for example, the IRFI server (e.g., a computer application, device, program etc.) may define IRFI data packages based on benchmark tenors (e.g., 2 Year, 5 Year, 7 Year, 10 Year, 30 Year etc.) and maturity (e.g., Quarterly, first year, second year etc.) at 102. The IRFI server may then set up a schedule (at 104) based on liquidity events and Treasury auction schedule that may be accessed from a database included in the IRFI system (herein "IRFI database). The IRFI server may determine risk unit sizes or a constant DV01 (at 106) for each of the IRFI product (e.g., contract) included in the IRFI data package. In one implementation, determination of risk unit sizes is based on the principle that at zero bound a special relationship exists for a par bond. That is at zero bound the DV01, modified duration, and Macaulay duration are exactly the same, and at zero bound these measures are exactly equal to the time of maturity of the security. The determination of forward exposure/risk unit size is further described herein. The IRFI server may determine hedge ratios (at 108) (e.g., spread ratios) based on the risk unit size determined. For example, if the risk unit size (unit of risk) on a 2 year IRFI product is 20 and the risk unit size on a 10 year product is too then the 2 year-10 year spread ratio is 1:5. Hence, the IRFI server eliminates awkward spread ratios to simple round values. The IRFI server may add at least one contract (at no) on a platform (e.g., a web based application, a mobile component, a server application, etc.) on the first day of the schedule (determined at 104) to enable exchange of data packages (e.g., trading).

Figure 2:
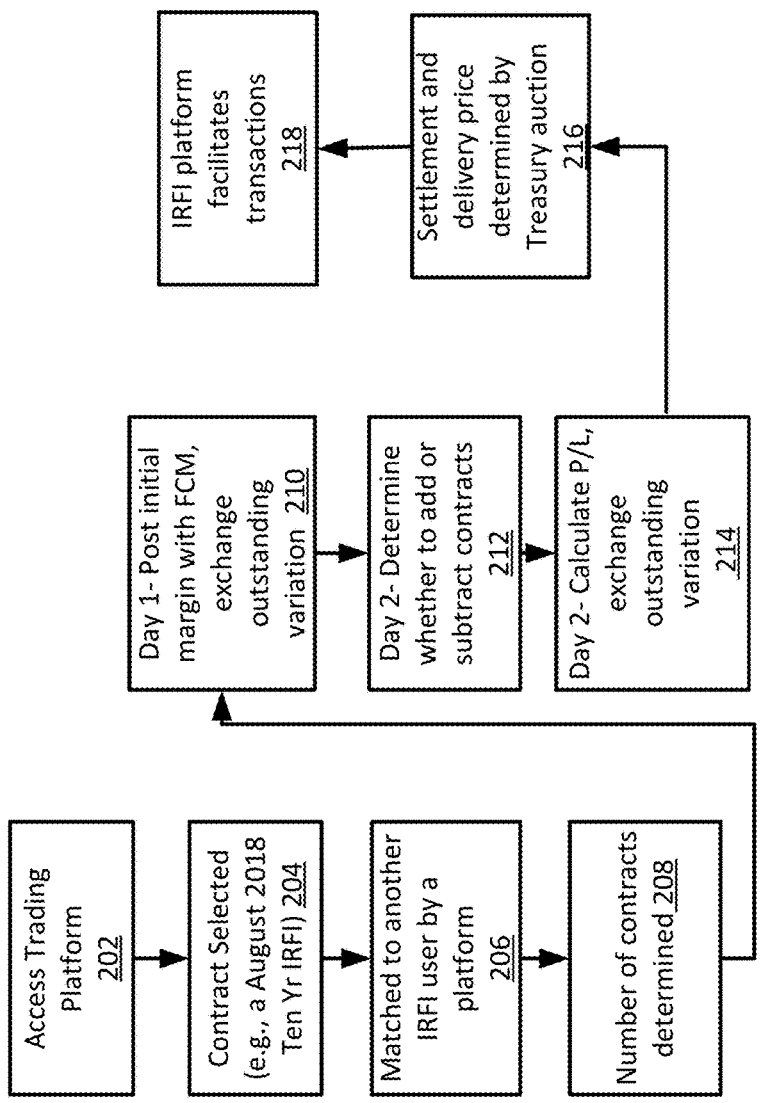
FIG. 2 provides an example logic flow illustrating aspects of a trading strategy including IRFI data packages, according to one embodiment of the IRFI.

FIG. 2 provides an example logic flow illustrating aspects of a trading strategy including IRFI data packages, according to one embodiment of the IRFI. As shown in FIG. 2, for example, the IRFI user (e.g., an investor, a portfolio manager, a trader, etc.) may initiate and/or access a platform (e.g., a web based application, a mobile component, a server application, etc.) at 202, which may provide a list of listed future contracts such as IRFI data packages developed by the IRFI server to users. The user may select a contract to trade (at 204), e.g., a May 2016 Ten Yr IRFI data packages which may include a long dated When-Issued (WI) contract on the new 10 year Treasury to be auctioned in May 2016. The IRFI user may be matched to another IRFI user (at 206) by the same platform (in 202) or a different platform/application. The user may determine the number of contracts to trade (at 208) based on the risk unit size of the WI contract, wherein the basis point may be equal to a fixed dollar value of $100. At the end of day one of trading the IRF user may post initial margin with the Futures Commission Merchant (FCM) and outstanding variation if any may be exchanged depending on the trade (at 210). On day two of exchange, the IRFI user may determine whether to add or subtract contracts (at 212). At the end of day two of trading, variation margin may be determined by calculating the Profit and Loss (P/L) (at 214) and outstanding variation if any may be exchanged. In some embodiments, a proxy implied notional value may be determined at the end of each day of trading depending on the auction stop value determined at the end of each day. The settlement yield and delivery price may then be determined by the corresponding Treasury Auction, and such information may be provided to the IRFI at 216. The IRF platform may also optionally facilitate a transaction of the delivery amount at 218, e.g., via an exchange or the OTC market.

Figure 3:
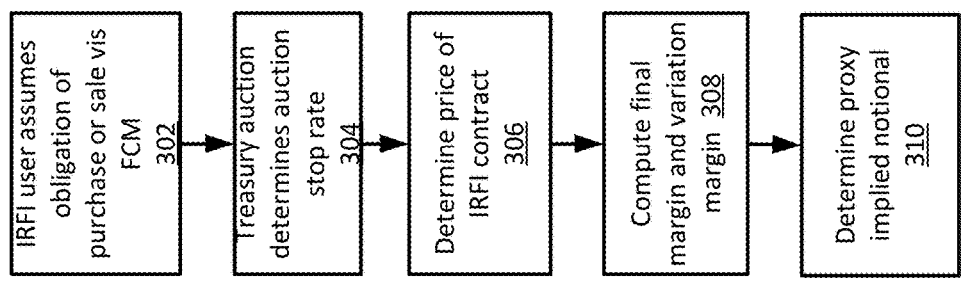
FIG. 3 provides an example logic flow illustrating aspects of expiration and settlement process of IRFI data packets/packages, according to one embodiment of the IRFI.

FIG. 3 provides an example logic flow illustrating aspects of expiration and settlement process of IRFI data packages, according to one embodiment of the IRFI. On auction settlement date, the IRFI user may assume obligations via the IRFI user's FCM of a purchase or sale in the underlying new issue for settlement via a clearing house (e.g., FICC), provided that the IRFI user is holding positions through delivery at 302. Corresponding treasury auction may determine the auction stop rate (at 304) at the end of the settlement date. Optionally, this information may be provided to IRFI. In some embodiments, the settlement price and the delivery price of the IRF data package exchange may be computed by IRFI. In some embodiments, the settlement and the delivery price may be computed via existing platforms/infrastructure and this information may be provided to IRFI. To compute the settlement price, the price of the IRFI contract may be computed (at 306) as 100-yield. The final margin and the variation margins may then be computed (at 308) based on P/L calculations. The proxy implied notional value may be computed (at 310) from bond risk to determine settlement. For example, bond risk is calculated as an average of one basis point move up and one basis point down of the underlying. Thus, the settlement process is elegant, simple, and transparent.

Figure 4A:
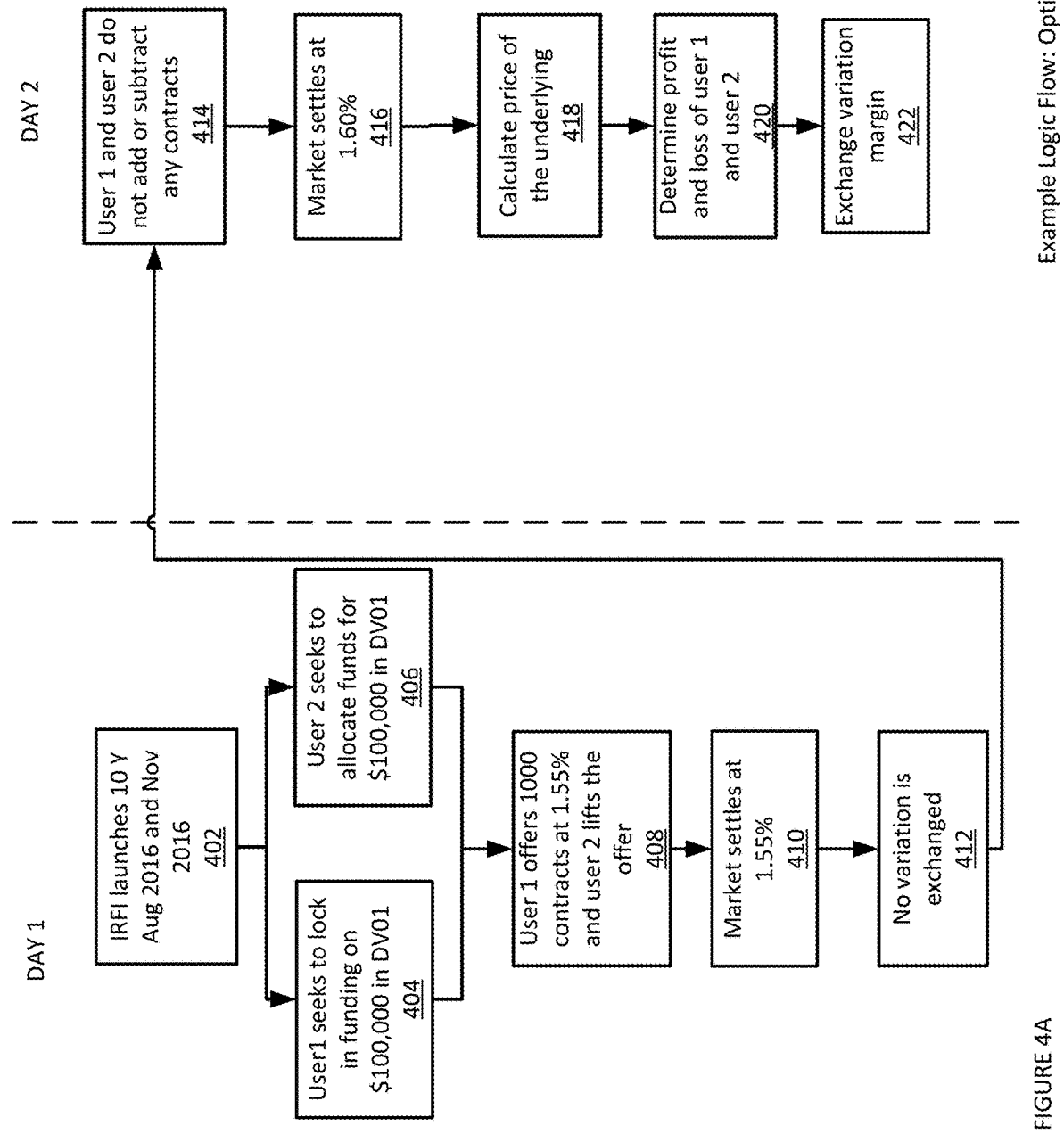
FIGS. 4A and 4B provide a block diagram illustrating a numeric example of IRFI using IRFI data packages to trade an option, according to an embodiment.
Figure 4B:
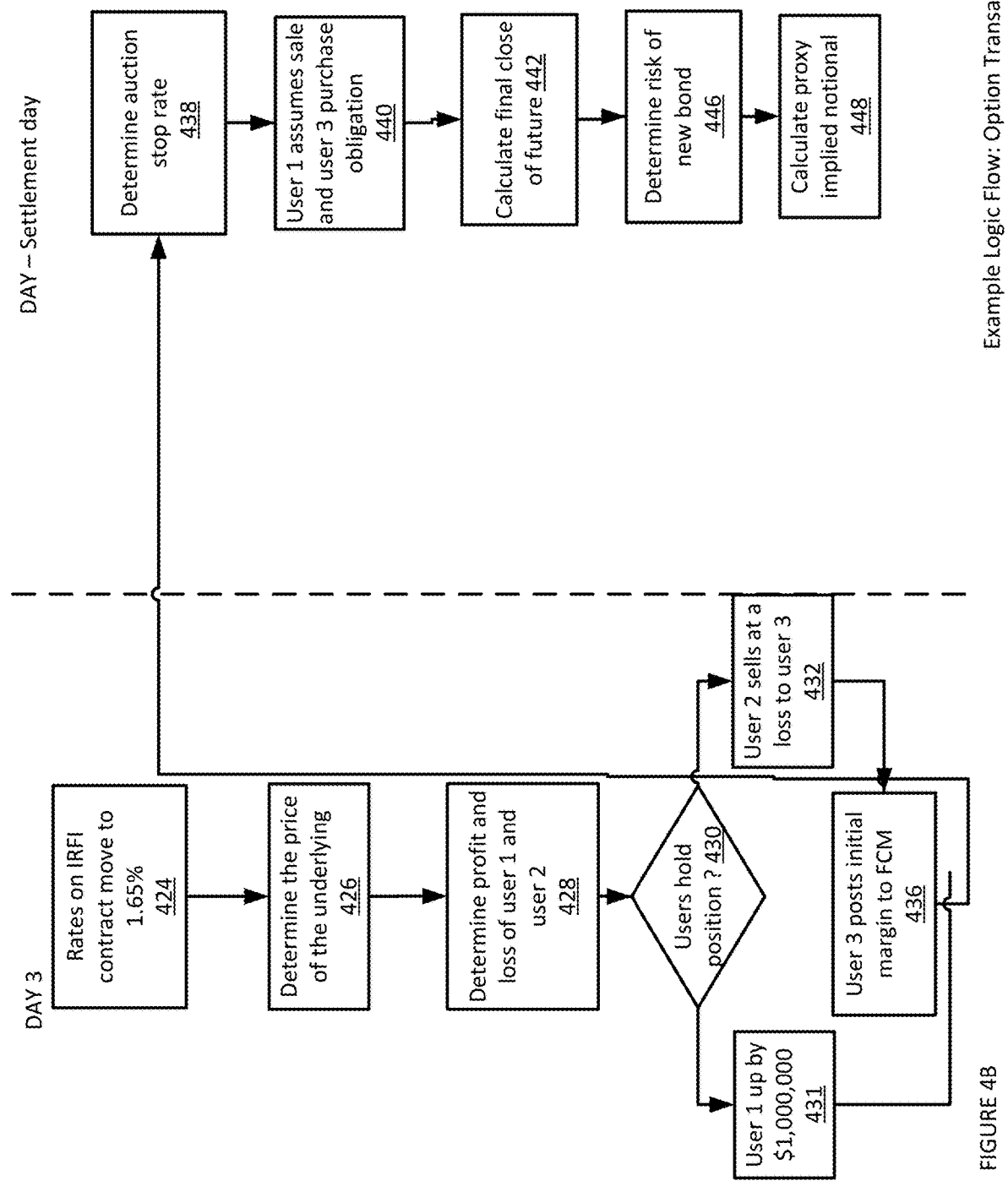

FIGS. 4A-4B provide a block diagram illustrating a numeric example of IRFI using IRFI data packages to trade an option, according to an embodiment. As shown in the FIG. 4A, on day 1, the IRFI may launch two IRFI products such as, a 10 year August 2016 IRFI contract and a November 2016 contract with a defined $100 unit of risk or risk unit size/forward exposure at 402. A user say user 1 (e.g., an investor, a portfolio manager, a trader, etc.) may seek to lock in funding in the next two months on $100,000 in DV01 (at 404). Another user say user 2 may seek to allocate funds into the treasury market for $100,000 in DV01 (at 406). User 1 offers 1000 contracts of 10 year August 2016 contract at 1.55% and user 2 lifts the offer for 1000 contracts at 1.55% (at 408). The IRFI server may receive the information of market settling at 1.55% on day 1 (at 410). User 1 and user 2 may post initial margin with their corresponding FCM. However, no variation is exchanged (at 412) since the close was at 1.55%.

On day 2, user 1 and user 2 communicate with the IRFI server and neither user 1 nor user 2 add or subtract any contracts (414). The IRFI server may receive the information that the market settles at 1.60% on day 2 (at 416). Price of the underlying is calculated as too-yield which is 98.40 (at 418) and the price may be communicated with the IRFI server. In some embodiments, the IRFI system includes a processor that computes the price of the underlying as 100-yield. The profit and loss for user 1 and user 2 are determined (at 420). User 1 has a 5 basis point gain in profit and loss while user 2 has a 5 basis point loss in profit and loss. Profit and loss is 1000 contracts times 5 basis points multiplied by $100 per unit risk which is $500,000. Therefore, user 1 receives $500,000 in variation margin and user 2 transfers $500,000 in variation margin (at 422). In some embodiments, the IRFI platform may facilitate the exchange of variation margin amounts.

Referring to FIG. 4B, on day 3, the IRFI server is notified that rates have moved higher on the ten year August 2016 IRFI contract to 1.65% (at 424). The price of the underlying is determined to drop from 98.40 to 98.35 (at 426). The profit and loss of user 1 and user 2 are determined (at 428) as 1000 contracts times 5 basis points multiplied by $100 per unit risk which is $500,000. In some embodiments, the IRFI platform may provide the users with an option of holding their data package exchange positions or changing their position (at 43). User 1 holds a position of P/L up by $1,000,000 (at 431). User 2 closes user 2's position to cut risk. The account of User 2 is down $1,000,000 from inception due to variation margin and the position out is at 98.35. User 2 sells at a loss to yet another user, say user 3 (at 432) and the initial margin of user 2 is returned. User 3 may post initial margin to FCM and thus establishes a position at 98.35 where the market closes (at 436).

On settlement day, user 1 and user 3 are still holding positions. The auction stop rate is determined to be 1.5% (at 438). User 1 and user 3 assume obligations via their corresponding FCMs if purchase or sale in the underlying new issue. User 1 is short 1000 contracts and assumes a sale obligation and user 3 is long 1000 contracts and assumes a purchase obligation (at 440). The final close of the future is determined as 100-1.50 which is 98 (at 442). User 1 who sold 1000 contracts at 1.55% is down 5 basis points from inception to date and user 2 who purchased 1000 contracts at 1.5% is up 15 basis points. "The new ten year 1.5% august 2016 contract that has a price of par with auction stop at 1.5% and may become the price of obligations into FICC (at 444). The risk of the new bond at the auction stop or the DV01 is determined to be $924.5 per million (at 446). The corresponding equivalent bond notional values are determined by simply adding the risk in the number of contracts, that is, 1000 times 100 which is $100,000 and dividing this quantity by the risk of the new bond calculated at 446 (at 448). Therefore, the proxy implied notional is determined as 108.16 million. The IRFI platform may optionally facilitate the exchange for an implied notional as determined in step 448. In other embodiments, the data packages with the implied proxy notional determined in step 448 are exchanged over existing platforms/infrastructure.

In one implementation, the exchange method utilized by the IRFI can force convergence of the cash and futures market that in turn insures that the futures represent true economics while providing an outlet for arbitrage.

Figure 5:
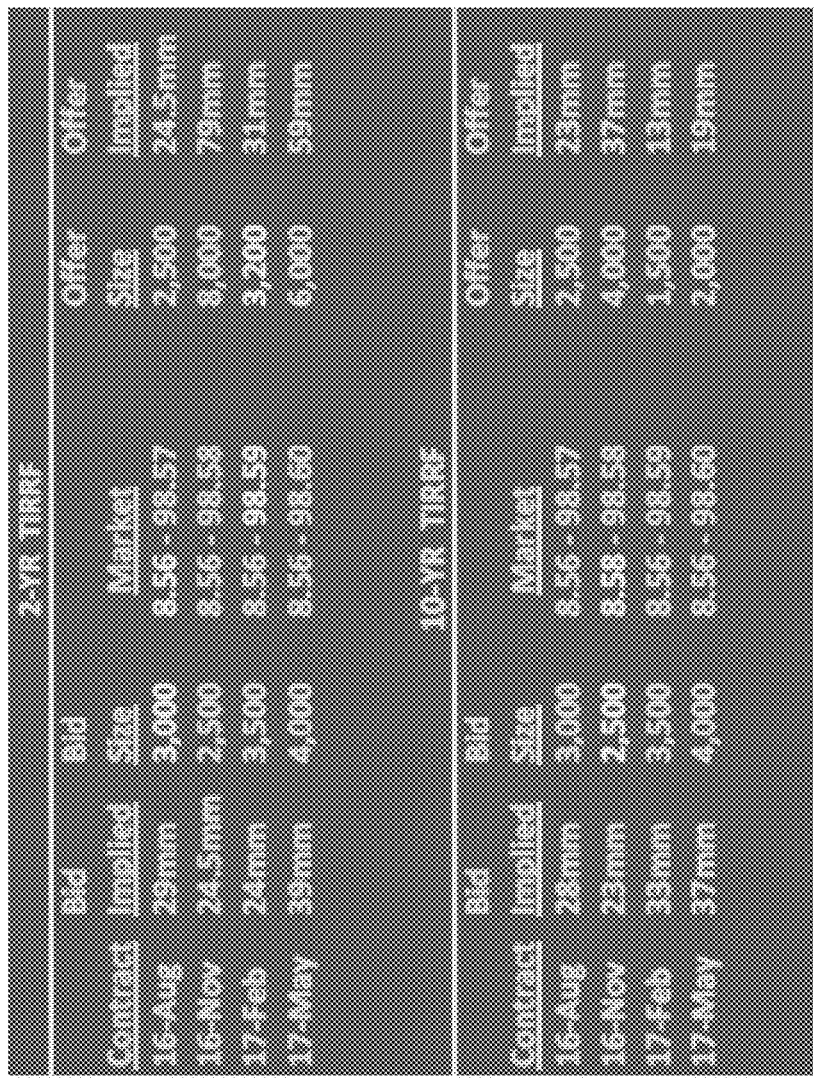
FIG. 5 is an example display screen of the application or platform of the IRFI in accordance with some embodiments.

FIG. 5 is an example display screen of the application or platform of the IRFI in accordance with some embodiments. The screen may display the IRFI data packages (e.g., contracts), the implied proxy notional of the exchange for each day of trading, and the size of the contracts being exchanged. In this example, the information related to a 2 year contract and a to year contract are displayed.

Forward Exposure/Risk Unit Size—This section further discloses the method implemented by the IRFI to determine risk unit size and the motivation behind the disclosed method.

In one implementation, the IRFI can eliminate massive convexity adjustments and the need for complex models for pricing data packages such as contracts. In contrast to the existing pricing models and applications, the IRFI utilizes a simple linear relationship between yield and price to determine rounded risk unit sizes. The determination of the linear relationship and the risk unit sizes are further disclosed herein.

Currently, Treasury market securities trade in price, and settle with accrued interest. However, most users (e.g., investors, traders, etc.) consider yield rather than price to manage a collection of data packages (e.g., portfolios). For coupon-bearing bonds, such as U.S. Treasuries, the relationship between price and yield assuming no accrued interest is given as:

$$P = \text{Sum}(i = 1 \ldots N)\left[(c/k)\left(1 + \frac{y}{k}\right)^{-kt_i}\right] + 100\left(1 + \frac{y}{k}\right)^{-kT}$$

P=price
e=coupon rate
k=payment periods per year
y=yield to maturity
T=time to maturity
$t_i$=time from now to the i-th coupon yet to be paid Using the above relationship, computational time to determine price given yield may be considerably small however, the computational time and effort to determine yield given the price is very high. In order to determine the yield, an iterative approach is required and current implementations make successive "guesses" at yield until computed price given yield matches the price of the underlier. Therefore, most current approaches need to use a root finder such as Newton's method to determine yield.

In order to compute the yield, practitioners in fixed income markets today use duration which is expressed in terms of the "first derivative of price with respect to yield". Duration comes in a variety of forms, but they are all conveniently linked to each other with simple relationships. Some commonly used forms of duration are shown below:

The first derivative of price with respect to yield is known as the "DV01" (dollar value of a 1 basis point move) and is calculated using the power rule, that is, differentiation by chain rule on a power function:

$$dP/dy = \left(\frac{1}{1+y/k}\right) \text{Sum}(I=1\ldots N)[CF_i * t_i * DF(y, t_i)]$$

where, $$DF(y,t_i) = (1+y/k)^{-kt}$$

DF=function calculates present value of $1 that comes at time t $CF_i$=total cash flows that occur at time $t_i$ Other forms of duration are built on the first derivative of price with respect to yield:

$$\text{Macaulay duration} = \left(1 + \frac{y}{k}\right)\frac{dP}{dy} / P$$

$$\text{Modified duration} = \frac{dP/dy}{P}$$

Active management of an interest rate data package collection (e.g., portfolios) require users (e.g., portfolio managers, traders, etc.) to account for changes in duration. For example, consider two data packages as shown in table 1:

| Risk Bucket | Data Package Collection A | Data Package Collection B |
| --- | --- | --- |
| 2 YR | +$100k/bp | $0k/bp |
| 5 YR | +$10k/bp | $0k/bp |
| 10 YR | 0 | $50k/bp |
| 30 YR | 0 | $60k/bp |
| NET | $110k/bp | $110k/bp |

In this example, data package collections A and B have an equivalent amount of duration or DV01/risk which equals $110 k/bp. However, these data package collections may behave differently if, for example, the Federal Reserve were to raise interest rates by 1% overnight since the impact of a monetary policy decision affects short-term rates much more than long-term rates. In order to hedge this risk, one solution may be to liquidate data packages in the two and five year bucket. However, this may be undesirable since—the user may assume that the rate-hike is uncertain and may seek protection for a short period of time, some data packages (e.g., securities) may be illiquid and difficult to exchange (e.g., trade), some data packages such as securities may be attractively priced corporate bonds that are expected to perform better than other data packages such as U.S. Treasuries but nonetheless may have exposure to general level of interest rates.

When a user seeks to "sell $110 k/bp worth of bonds", the may need to first translate this into market convention which requires a face amount, or notional size, of a specific security or securities future to sell. Each potential hedging instrument has its own yield, price, and DV01 and so the user may need to equilibrate the following:

Notional Required=Risk to Hedge/$DV01$ of Hedging Instrument

It is important to note that DV01s do not remain static through time. $Dv01s$ decay as a function of time to maturity decreases however, $dv01s$ grown in magnitude with decrease in yield and coupons. Some data packages such as securities with embedded options (e.g., cheapest-to-deliver option) have additional uncertainty in their durations and can be difficult to model and predict without sophisticated risk management software.

Users such as bond portfolio managers often build a yield curve from a number of existing Treasury securities in order to estimate the correct risk-free rate, or discount factor, for cash flows at any arbitrary date. In practice however, there are many securities on the Treasury curve that have similar maturity dates but different coupons. Further, prices/yields can vary in a way that is not necessarily arbitrage free. Another complication includes most recently issued representative securities ("on the run securities") trading at markedly lower yields than neighboring seasoned securities ("off the run securities"). Finally, some securities may, for one reason or another, have a scarcity value that is reflected in financing, or "repo" markets.

Thus, the IRFI utilizes a constant DV01 that would greatly improve upon the current process of exchange (e.g., hedging) by eliminating—(1) conversion of the price of the hedging instrument to yield (2) calculation of DV01 on the hedging instrument and (3) calculation of the correct notional amount required for interest rate hedging. The IRFI can replace the above mentioned three steps with risk unit size/risk units which can be constant for all levels of yield and may be embedded in the data package (e.g., contract).

It is the case that if yields are at zero, and coupons are at zero, the price of a bond is equal to 100 (or "par") and the Macaulay Duration, Modified Duration, and DV01 are all equal to the time to maturity. This relationship motivates the choice of risk unit sizes such as 200 for the 2 yr, 500 for the 5 y, 1000 for the 10 y, 3000 for the 30 y contracts. In some embodiments, rather than choosing completely arbitrary values, DV01s that prevail at the zero bound for yields are chosen. In a normally functioning economy with positive interest rates, the zero bound DV01s represent the maximum DV01 that any coupon-bearing bond can attain. Additionally, at zero coupon the sensitivity/exposure of the data package is the time to maturity. Thus zero coupon exposure eliminates awkward ratios and assigns round number weights to data packages.

Therefore, the IRFI can enhance existing methodologies for curve construction and can provide new insights that are not captured by current methodologies. For example, the IRFI can provide a mechanism by which the liquidity premium of benchmark securities (e.g., 2 year, 5 year, 7 year, 10 year, etc.) can be measured directly. In another example, the IRFI can avoid many issues involved in bootstrapping actual securities such as effects of financial markets. In yet another example, the IRFI assumes on-market yield or "par" priced securities thereby eliminating adjustments that are otherwise required for premium and discount securities. A non-benchmark security (e.g., 6-year treasury) may be defined by adapting the shape of a suitable Treasury curve to fit through existing benchmark points, thereby estimating the yield of a hypothetical non-benchmark security with that maturity.

Figure 6A:
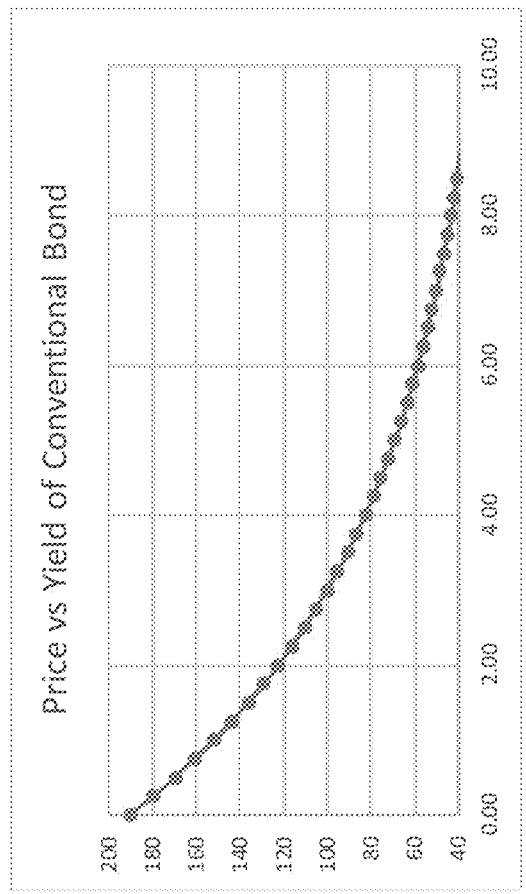
FIG. 6A is a plot illustrating price vs yield for a conventional bond.
Figure 6B:
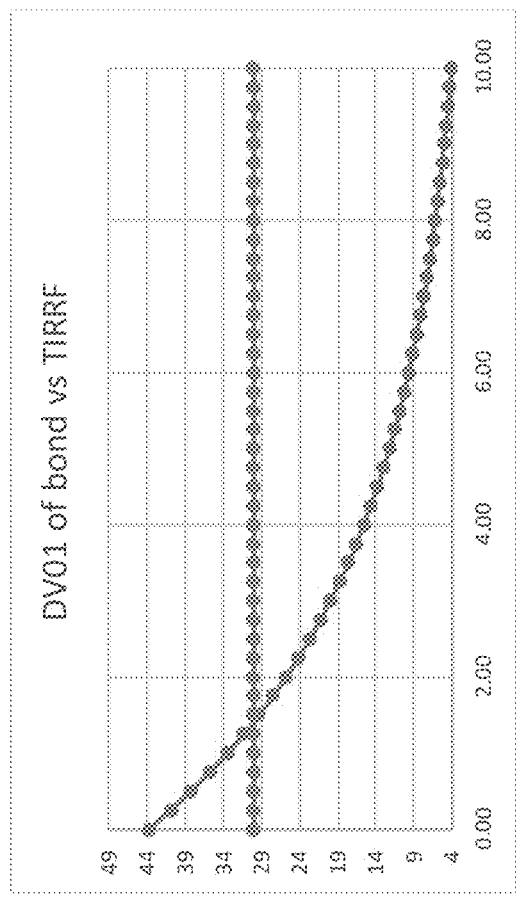
FIG. 6B is a plot illustrating DV01 of the bond disclosed in FIG. 6A vs DV01 as determined by the IRFI in accordance with some embodiments.

FIG. 6A is a plot illustrating price vs yield for a conventional bond. FIG. 6B is a plot illustrating DV01 of the bond disclosed in FIG. 6A vs DV01 as determined using the IRFI (e.g., IRFI data package). As shown in FIG. 6B, for example, say a user uses a 3% 30-year as hedge at low levels of rates (e.g., 3%). If a financial event forces yields much higher then, the current methodologies and infrastructure would render the 30-year, contract ineffective. However as seen from FIG. 6B the IRFI product/data package would have a constant exposure.

In one implementation, the IRFI facilitates trading forward rates and options on a liquid and widely watched benchmark. The IRFI permits options to be quoted and traded in basis points. Strikes are then struck at yield levels and longer expiration periods may be possible. In this way, the curve trades may be straightforward to users, and the user may not need to comprehend complex ratios (e.g., the trading data is a 1-1 spread since units are already exposure weighted). The IRFI, via the forward option markets, can offer a listed alternative to the OTC Swap Options Market, using IRFI data packages on existing futures infrastructure, which permits participants from other arenas to offset and transact in fixed income in a straightforward manner.

In one implementation, unlike other deliverable interest rate swap futures (e.g., Chicago Mercantile Exchange (CME) Group's interstate rate swap futures) that have a complicated delivery process scanning multiple days, and a lottery process to match longs vs shorts with bi-lateral exposures, IRFI data packages delivery is simple. For example, long futures have an obligation to buy at settlement the WI via Fixed Income Clearing Corporation (FICC) so it is equivalent to purchasing at the auction, and shorts become sales.

For another example, the IRFI may improve the conditions of CME Treasury Basket Futures that are plagued with embedded options, complex rules and require sophisticated trading models. In some instances, valuation can be difficult as contracts price off of a basket of bonds with various coupons, prices and durations. They do not reflect or track the major OTC benchmark. Most existing valuation models require assumptions on Repo financing, the shape of the yield curve, market direction and even volatility parameters. Basic OTC quoting and spreading conventions thus may not be applied to this contract. There is no yield to quote, and therefore a simple yield curve trade often requires awkward ratios that are difficult to execute without a computer program. Factor weightings, the exchange offset ratio, may create an unwanted directional bias. Weightings and offset ratios often change as does the composition of the bond basket. All these factors above may complicate forward analysis and therefore options may not have liquidity beyond the front two contracts. Physical delivery is required and most Future Commission Merchants (FCMs) may demand that the bonds are "boxed" for safe keeping. This in the past has caused a disruption the float of "cheapest-to-deliver" bonds resulting in fails in the FED Wire system.

As another example, unlike other deliverable interest rate swap futures that require complex analytics to derive the invoice yield spread, the forward yield spread of IRFI data packages can be obtained via subtraction between the two. The following table provides an example comparison between the IRFI data packages and the CME basket future:

|  | Cash Market | IRFI DATA PACKAGES | CME basket future |
| --- | --- | --- | --- |
| Description | WI on new Treasury | Listed future WI on new Treasury | Listed future on basket of Treasuries |
| Quoting | Yield | Yield | Price |
| Valuation | FWD yield Must assume coupon | FWD yield No need to assume coupon | Price based on optionality. Requires assumption on direction, curve, repo and volatility |
| Flexibility | Negotiated/ CLOB/RFQ | Negotiated/ CLOB/RFQ | CLOB/only massive blocks can circumvent |
| Convexity | Positive | Positive | Negative |
| Settlement | Auction | Auction | Last two minutes of trade |
| Delivery | FICC/FedWire | FICC/FedWire | Complex, exposure of early delivery, exposure of delivery after market close, FCM mandate securities to be "boxed" for safekeeping |

In this case, the IRFI may appeal to the majority of the users for a straightforward trading platform based on existing infrastructure. The IRFI may facilitate revenue generating, as the benchmark treasuries dominate over 600 billion daily transactions in Inter-Dealer market, and treasury futures can add 200-300 billion in notional transactions daily. The IRFI may attract offsetting and trading activity not only from the Interest Rate Swap (IRS) market or Treasury market but from all fixed income markets that utilize IRS or Treasuries to offset. By using IRFI, trading in options may exceed volumes of the underlying futures as options may have major influence of the market, which may offer a listed alternative to the massive yet less transparent Swap Option Market. In this way, transaction fees and exchange fees could contribute to the potential revenue as well, which may surpass millions in daily revenue.

In some embodiments of the disclosure, computer-based methods of increasing trading system security and processor efficiency for a multi-server exchange system (in some instances, having an artificial neural network) that provide interest-based instrument exchange, comprise instantiating, via a computer processor, a exchange platform on a first server; receiving a user selection of a data packet, such as a contract, at the first server from a second server, the selection including characteristic parameters associated with the data packet (e.g., contract); receiving at the first server a user-selected number or quantity of data packets (e.g., contracts)

to trade associated with a data packet metric, such as basis point (BP) for the contract, from the second server. Then, calculating or determining (e.g., via an artificial neural network), an EV (e.g., exposure value, exposure offset, or risk hedging) amount based on the data packet metric (e.g., BP for the contract) and the selected data packet string, number or quantity (e.g., number of contracts) to cover an EV (e.g., exposure) in a data exchange (e.g., auction). The method continues with the first server receiving a PV string (e.g., pricing data) from a third server associated with a data exchange system (e.g., auction system), the PV string (e.g., pricing data) including a SY metric or value (e.g., settlement yield) and a DP metric or value (e.g., delivery price). A DQ for the data packet (e.g., deliver quantity or delivery amount for the contract) is then calculated or determined (e.g., via artificial neural network or the like), the DQ based on the received PV string (e.g., pricing data). A secure exchange or transaction is facilitated and/or conducted for the DQ (e.g., a transaction of the delivery amount). In some such embodiments, the data packet/contract is traded/exchanged based on units of forward exposure or DV (Dollar Value of a basis point without a fixed notional value such that the actual quantity is in line with the forward exposure. In some embodiments, a price movement (PM) associated with a change in yield (dY) is held constant. Some embodiments are performed without iterative yield-to-price calculations. Example yield to price and price to yield (PtY) formulas are provided below.

Yield to price:
Quoted price to invoice price:

$$B_0(y) = P_0(y) + AI$$

Accrued interest:

$$AI = 12C(1 - lnlb)$$

Clean price from yield:

$$P_0(y) = 1(1+y_2)_{mtb}[\Sigma_{k=0m-1}C2(1+y2)k + 100(1+y2)m-1]$$

where:
C coupon rate
$P_0$ clean quoted price
$t_n$ number of days to next coupon payment
$t_b$ number of days from last coupon to next coupon
y yield to maturity
m number of coupon payments to maturity Price to Yield:
Assume the true yield to maturity of a bond is unknown and denoted by y^ and hence it's clean, quoted price in the market as $P_0$(y^), or for simplicity, P^ y^ may then determined simply as the solution to the following optimization problem using Newton-Raphson or similar:

$$\arg\min_y\{(Po(y)-P\hat{})2\}$$

Example code:
%-*-coding: utf-8-*-
\documentclass{beamer}
\begin{document}
\title{Bond Formulas}
\author{ }
\date{ }
\begin{frame}
\titlepage
\end{frame}
\section[Introduction]{Yield to Price}
\begin{frame}
Quoted price to invoice price:
\[B_o(y)=P_o(y)+AI\]
Accrued interest:
\[AI=\frac{1}{2}{C(1-\frac{t_{n}}{t_{b}})}\]
Clean price from yield:
\[P_o(y)=\frac{1}{(1+\frac{y}{2})}
^{\frac{t_{n}}{t_{b}}}}[{\sum_{k=0}^{m-1}\frac{C}{2
(1+\frac{y}{2})^k)+\frac{100}{(1+\frac{y}{2})^{m-1}}]\]
where:
\begin{enumerate}
\item $C$ coupon rate
\item $P_o$ clean quoted price
\item $t_n$ number of days to next coupon payment
\item $t_b$ number of days from last coupon to next coupon
\item $y$ yield to maturity
\item $sm$ number of coupon payments to maturity
\end{enumerate}
\end{frame}
\section[Introduction]{Price to Yield}
\begin{frame}
Assume the true yield to maturity of a bond is unknown and denoted by $\hat{y}$ and hence it's clean, quoted price in the market as $P_o(\hat{y})$, or for simplicity, $\hat{P}$ $\hat{y}$ may then determined simply as the solution to the following optimization problem using Newton-Raphson or similar:
\[\underset{y}{\operatorname{argmin}}\lbrace(P_o(y)-$\hat{P}$)^2\rbrace
\end{frame}
\end{document}
%%% END In some embodiments, settlement of the transaction is determined by a corresponding Treasury Auction without requiring a separate calculation. In some embodiments, interest-based instruments are provided in round units of exposure such that spread trading is in fixed ratios. In some embodiments, interest-based instrument exposure of a basis point movement is fixed.

In some embodiments of the disclosure, a secure, high-efficiency interest rate based instrument exchange apparatus, comprises: a plurality of processors; a memory storing processor-readable instructions, the processor-readable instructions being executable by the plurality of processors to: instantiate an exchange platform; receive a selection (e.g., user selection) of a contract including characteristic parameters associated with the contract; receive a selected (e.g., user selected) number of contracts to trade associated with a basis point for the contract; determine a exposure offsetting amount based on the basis point for the contract and the selected number of contracts to cover a exposure in an auction; receive pricing data from an auction system, including a settlement yield and a delivery price; and determine a delivery amount for the contract based on the pricing data; and facilitate a transaction of the delivery amount. In some such embodiments, the contract is traded based on units of forward exposure or Dollar value of a basis point without a fixed quantity. In some embodiments, a value at exposure of the contract is a volatility in basis points multiplied by a number of contracts times a exposure unit. In some embodiments, settlement of the transaction is determined by a corresponding Treasury Auction instead of a price of the transaction. In some embodiments, the apparatus further includes a calculator or like component. The calculator/calculator component can include one or more artificial neural networks, for example, an artificial neural network trained to calculate an exposure offsetting amount and/or a delivery amount for a contract. In some embodiments, an artificial neural network can include or comprise a multi-layer perceptron feedforward artificial neural network. In some embodiments, at least one artificial neural network includes three or more layers, with at least one input layer, a hidden layer and an output layer—in such an embodiment, the input layer can be configured to receive one or more indicia representing: a basis point for a contract, a number of contracts to cover a exposure in an auction, pricing data, settlement yield values, and/or delivery price values. In some embodiments, the hidden layer is configured to map the values received through the input layer via one or more nonlinear functions to generate data packages, including but not limited to an exposure offsetting amount and/or a delivery amount for a contract.

Embodiments of the disclosure include a computer-based method of providing communication system security and processor efficiency across a multi-server data exchange system having (which in some embodiments can include an artificial neural network that provides validated IBI (interest rate based instrument) communications and data exchanges, the method comprising: instantiating a data exchanger (exchange platform) on a first computer server; receiving an encrypted identifier of a data package (user selection of a contract) at the first computer server over a secure communication network from a second computer server, the encrypted identifier encrypted at the second computer server; decrypting the encrypted identifier at the first computer server to determine a plurality of data package parameters associated with the data package (characteristic parameters associated with the contract); securely receiving at the first computer server a specified data package quantity string (or value/user selected number of contracts) from the second computer server, the specified data package quantity string associated with a BP value of the data package (basis point of the contract); calculating, via artificial neural network, an offset value (exposure offsetting amount) based on the BP value (basis point) of the data package (contract) and the specified data package quantity string (number of contracts) to correspond to an EV (exposure value) in a data exchange (auction); receiving a PV string (pricing data) at the first computer server over a secure network from a third computer server associated with a data exchange system (auction system), the PV string (pricing data) including a SY value (settlement yield) and a DP value (delivery price): calculating, (in some embodiments, via artificial neural network), a DQ (delivery amount) for the data package (contract) based on the received PV string (pricing data) at the first computer server; and facilitating a secure exchange (transaction) of the DQ (delivery amount), the data package (contract) exchanged (traded) based on FE units (units of forward exposure) or DV of a BP (Dollar Value of a basis point) without a fixed NV (notional value) such that actual quantity of a data package exchanged corresponds to the FE units (is in line with the forward exposure).

In some embodiments of the disclosure, a secure, high-efficiency multi-server data packet (e.g., interest rate based instrument) exchange apparatus is disclosed, the apparatus comprising: a plurality of processors; a memory in communication with the plurality of processors and storing processor-readable instructions, the processor-readable instructions being executable by the plurality of processors to: instantiate a data exchange platform; receive a secure data packet selection (e.g., user selection of a contract), the secure data packet selection including a plurality of data packet parameters (e.g., parameters associated with the interest rate based instrument/contract); receive a data packet quantity string to exchange associated with a data packet BP metric (e.g., user selected number of contracts to trade associated with a basis point for the contract); calculate/determine an offset metric based on the data packet BP metric and the data packet quantity string to correspond to an EV in a data exchange (e.g., an exposure offsetting amount based on the basis point for the contract and the user selected number of contracts to cover a exposure in an auction); receive a PV string from a data exchange system the PV string including a SY metric and DP metric (e.g., pricing data from an auction system, including a settlement yield and a delivery price); calculate a data packet DQ based on the PV string (e.g., determine a delivery amount for the contract based on the pricing data); and execute a secure exchange of the DQ (e.g., facilitate a transaction of the delivery amount). In some embodiments, the data packet (e.g., contract) is exchanged (traded) based on FE units and/or DP DV without a set quantity (e.g., units of forward exposure or Dollar value of a basis point without a fixed quantity). In some embodiments, a VALX of the data packet (e.g., value at exposure of the contract) is VOLBP*(# data packets)*EU (e.g., a volatility in basis points multiplied by a number of contracts times a exposure unit).

In some embodiments, completion of the exchange (e.g., settlement of the transaction) is determined by a corresponding Treasury Auction (and/or the like) instead of a price of the transaction. In some embodiments, the apparatus further comprises a calculator or calculator component. In some embodiments, the calculator component includes an artificial neural network. The artificial neural network can be trained to calculate an offset metric and/or data packet DQ (e.g., a exposure offsetting amount and/or a delivery amount for a contract). In some embodiments, the artificial neural network is a multi-layer perceptron feedforward artificial neural network. In some embodiments, the artificial neural network includes three or more layers, with at least one input layer, a hidden layer and an output layer. In some embodiments, the input layer is configured to receive one or more indicia associated with or representing data packet parameters and/or metrics, such as a data packet BP (basis point for a contract), a number of contracts to cover an exposure in an auction, pricing data, settlement yield values, delivery price values, and/or the like. In some embodiments the hidden layer is configured to map the one or more indicia received through the input layer via one or more nonlinear functions to generate data packets parameters (the data packets including but not limited to a exposure offsetting amount and/or a delivery amount for a contract).

IRFI Controller

Figure 7:
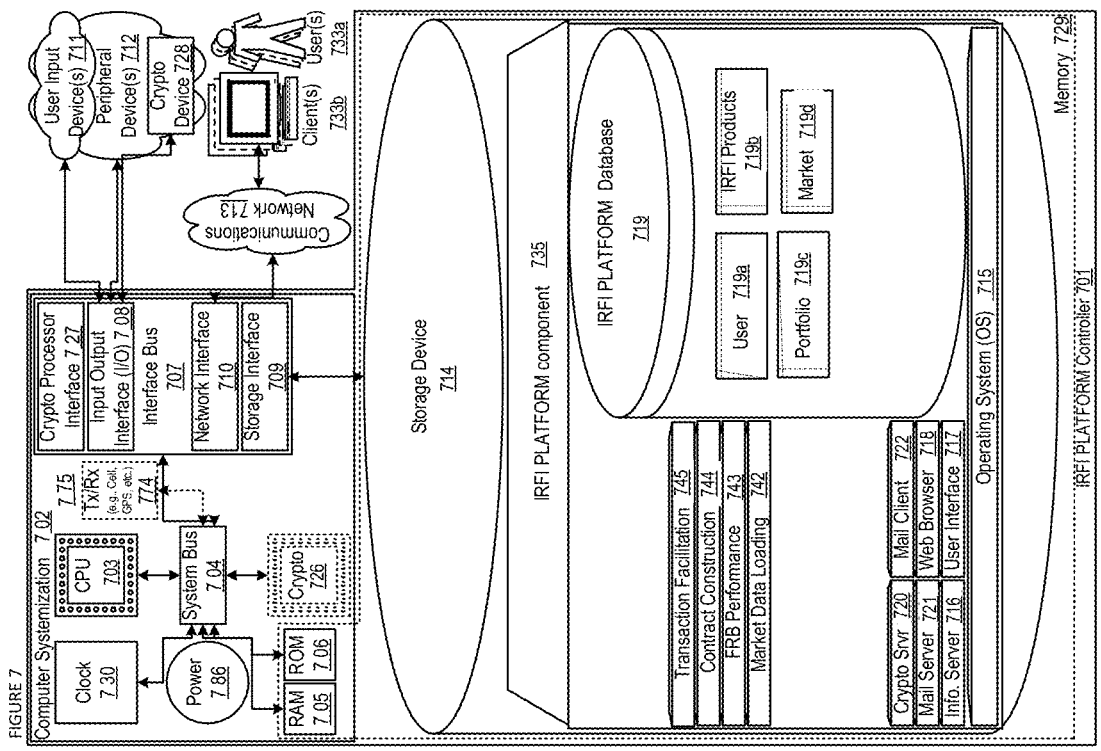
FIG. 7 shows a block diagram illustrating example aspects of an IRFI controller.

FIG. 7 shows a block diagram illustrating example aspects of a IRFI controller 701. In this embodiment, the IRFI controller 701 may serve to aggregate, process, store, search, serve, identify, instruct, generate, match, and/or facilitate interactions with a computer through various technologies, and/or other related data.

Users, e.g., 733*a*, which may be people and/or other systems, may engage information technology systems (e.g., computers) to facilitate information processing. In turn, computers employ processors to process information; such processors 703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the IRFI controller 701 may be connected to and/or communicate with entities such as, but not limited to: one or more users from user input devices 711; peripheral devices 712; an optional cryptographic processor device 728; and/or a communications network 713. For example, the IRFI controller 701 may be connected to and/or communicate with users, e.g., 733a, operating client device(s), e.g., 733b, including, but not limited to, personal computer(s), server(s) and/or various mobile device(s) including, but not limited to, cellular telephone(s), smartphone(s)(e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations, A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The IRFI controller 701 may be based on computer systems that may comprise, but are not limited to, components such as: a computer systemization 702 connected to memory 729.

Computer Systemization

A computer systemization 702 may comprise a clock 730, central processing unit ("CPU(s)" and/or "processor(s)" (these terms are used interchangeably throughout the disclosure unless noted to the contrary)) 703, a memory 729 (e.g., a read only memory (ROM) 706, a random access memory (RAM) 705, etc.), and/or an interface bus 707, and most frequently, although not necessarily, are all interconnected and/or communicating through a system bus 704 on one or more (mother)board(s) 702 having conductive and/or otherwise transportive circuit pathways through which instructions (e.g., binary encoded signals) may travel to effectuate communications, operations, storage, etc. The computer systemization may be connected to a power source 786; e.g., optionally the power source may be internal. Optionally, a cryptographic processor 726 and/or transceivers (e.g., ICs) 774 may be connected to the system bus. In another embodiment, the cryptographic processor and/or transceivers may be connected as either internal and/or external peripheral devices 712 via the interface bus I/O. In turn, the transceivers may be connected to antenna(s) 775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing IRFI controller to determine its location)); Broadcom BCM4329FKUBG transceiver chip (e.g., providing 802.11n, Bluetooth 2.1+EDR, FM, etc.), BCM2815 (ISPA+) and BCM2076 (Bluetooth 4.0, PS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM7/9/3), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the IRFI controller and beyond through various interfaces. Should processing requirements dictate a greater amount speed and/or capacity, distributed processors (e.g., Distributed IRFI), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the IRFI may be achieved by implementing a microcontroller such as CAST's R8051XC2 microcontroller; Intel's MCS 51 (i.e., 8051 microcontroller); and/or the like. Also, to implement certain features of the IRFI, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the IRFI component collection (distributed or otherwise) and/or features may be implemented via the microprocessor and/or via embedded components; e.g., via ASIC, coprocessor, DSP, FPGA, and/or the like. Alternately, some implementations of the IRFI may be implemented with embedded components that are configured and used to achieve a variety of features or signal processing.

Depending on the particular implementation, the embedded components may include software solutions, hardware solutions, and/or some combination of both hardware/software solutions. For example, IRFI features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the IRFI features. A hierarchy of programmable interconnects allow logic blocks to be interconnected as needed by the IRF system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the IRFI may be developed on regular FPGAs and then migrated into a fixed version that more resembles ASIC implementations. Alternate or coordinating implementations may migrate IRFI controller features to a final ASIC instead of or in addition to FPGAs. Depending on the implementation all of the aforementioned embedded components and microprocessors may be considered the "CPU" and/or "processor" for the IRFI.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the IRFI thereby providing an electric current to all the interconnected components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(ses) 707 may accept, connect, and/or communicate to a number of interface adapters, frequently, although not necessarily in the form of adapter cards, such as but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 709 may accept, communicate, and/or connect to a number of storage devices such as, but not limited to: storage devices 314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 710 may accept, communicate, and/or connect to a communications network 713. Through a communications network 313, the IRFI controller is accessible through remote clients 733b (e.g., computers with web browsers) by users 733a. Network interfaces may employ connection protocols such as, but not limited to: direct connect, Ethernet (thick, thin, twisted pair 10/1/1000 Base T, and/or the like), Token Ring, wireless connection such as IEEE 802.11a-x, and/or the like. Should processing requirements dictate a greater amount speed and/or capacity, distributed network controllers (e.g., Distributed IRFI), architectures may similarly be employed to pool, load balance, and/or otherwise increase the communicative bandwidth required by the IRFI controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), 1-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDM), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 711 often are a type of peripheral device 712 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 712 may be connected and/or communicate to I/O and/or other facilities of the like such as network interfaces, storage interfaces, directly to the interface bus, system bus, the CPU, and/or the like. Peripheral devices may be external, internal and/or part of the IRFI controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 728), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the IRFI controller may be embodied as an embedded, dedicated, and/or monitor-less (i.e., headless) device, wherein access may be provided over a network interface connection.

Cryptographic units such as, but not limited to, microcontrollers, processors 726, interfaces 727, and/or devices 728 may be attached, and/or communicate with the IRFI controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868: and/or the like.

Memory

Generally, any mechanization and/or embodiment allowing a processor to affect the storage and/or retrieval of information is regarded as memory 729. However, memory is a fungible technology and resource, thus, any number of memory embodiments may be employed in lieu of or in concert with one another. It is to be understood that the IRFI controller and/or a computer systemization may employ various forms of memory 729. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 729 may include ROM 706, RAM 705, and a storage device 714. A storage device 314 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, ID DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); the IRFI component(s) 735; and/or the like (i.e., collectively a component collection). These components may be stored and accessed from the storage devices and/or from storage devices accessible through an interface bus. Although non-conventional program components such as those in the component collection may be stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the IRFI controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the IRFI controller to communicate with other entities through a communications network 713. Various communication protocols may be used by the IRFI controller as a subcarrier transport mechanism for interaction, such as, but not limited to: multicast, TCP/IP, UDP, unicast, and/or the like.

Information Server

An information server component 716 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); Hype/Text Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETFs) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the IRFI controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the IRFI database 719, operating systems, other program components, user interfaces, Web browsers, and/or the like.

Access to the IRFI database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the IRFI. In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the IRFI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and OS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 717 is a stored program component that is executed by a CPU. The user interface may be a graphic user interface as provided by, with, and/or atop operating systems and/or operating environments such as already discussed. The user interface may allow for the display, execution, Interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

FIG. 5 illustrates an example display screen provided by the user interface component 717 in accordance with some embodiments.

Web-Browser

A Web browser component 718 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components' through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the IRFI equipped nodes. The combined application may be nugatory on systems employing standard Web browsers.

Mail Server

A mail server component 721 is a stored program component that is executed by a CPU 703. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective–) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the IRFI.

Access to the IRFI mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDFA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket layer (SSL), Secure Hypertext Transfer Protocol (HTTPS), and/or the like. Employing such encryption security protocols, the IRFI may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the IRFI component to engage in secure transactions if so desired. The cryptographic component facilitates the secure accessing of resources on the IRFI and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The IRFI Database

The IRFI database component 719 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the IRFI database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the IRFI database is implemented as a data-structure, the use of the IRFI database 719 may be integrated into another component such as the IRFI component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719a-d. A Users table 319a may include fields such as, but not limited to: user_id, user_device_id, username, password, dob, first-name, last_name, age, state, address_firstline, address_secondline, zipcode, devices_list, contact_info, contact_type, alt_contact_info, alt_contact_type, and/or the like. The Users table may support and/or track multiple entity accounts on an IRFI. An IRF PRODUCTS (or data packages) table 719b may include fields such as, but not limited to: IRFI PRODUCTS_date, IRFI products_type, IRFI products_rate, IRFI products_amount, IRFI products_expiration, IRFI products_bond, and/or the like. A Portfolio 719c may include fields such as, but not limited to: portfolio_id, portfolio_user_id, portfolio_IRFI products_id, portfolio_IRFI products_id, portfolio_offsetting, portfolio_amount, portfolio_date, and/or the like. A market data table 719d includes fields such as, but not limited to: market-data-feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the IRFI database may interact with other database systems. For example, employing a distributed database system, queries and data access by search IRFI component may treat the combination of the IRFI database, an integrated data security layer database as a single database entity.

In one embodiment, user programs may contain various user interface primitives, which may serve to update the IRFI. Also, various accounts may require custom database tables depending upon the environments and the types of clients the IRFI may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719*a-d*. The IRFI may be configured to keep track of various settings, inputs, and parameters via database controllers.

The IRFI database may communicate to and/or with other components in a component collection, including itself, and/or facilities of the like. Most frequently, the IRFI database communicates with the IRF component, other program components, and/or the like. The database may contain, retain, and provide information regarding other nodes and data.

The IRFIs

The IRFI component 735 is a stored program component that is executed by a CPU. In one embodiment, the IRFI component incorporates any and/or all combinations of the aspects of the IRFI discussed in the previous figures. As such, the IRFI affects accessing, obtaining and the provision of information, services, transactions, and/or the like across various communications networks. The features and embodiments of the IRFI discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the IRFI's features and facilities, and in many cases reduce the costs, energy consumption/requirements, and extend the life of IRFI's underlying infrastructure; this has the added benefit of making the IRFI more reliable. Similarly, many of the features and mechanisms are designed to be easier for users to use and access, thereby broadening the audience that may enjoy/employ and exploit the feature sets of the IRFI; such ease of use also helps to increase the reliability of the IRFI. In Addition, the feature sets include heightened security as noted via the Cryptographic components 720, 726, 728 and throughout, making access to the features and data more reliable and secure.

The IRFI component may transform market data via IRFI components, such as but not limited to a market data loading component 742, Federal Reverse Board performance analysis component 743, Contract Construction component 744 (e.g., see 102-104 in FIG. 1, etc.), Transaction facilitation component 745 (e.g., see 206 in FIG. 2, etc.), and/or the like into a financial transaction 742 (e.g., 216-218 in FIG. 2, etc.), and/or the like and use of the IRFI.

The IRFI component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools. PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the IRFI server employs a cryptographic server to encrypt and decrypt communications. The IRFI component may communicate to and/or with other components in a component collection, including itself, and/or facilities of the like. Most frequently, the IRFI component communicates with the IRFI database, operating systems, other program components, and/or the like. The IRFI may contain, communicate, generate, obtain, and/or provide program component, system, user, and/or data communications, requests, and/or responses.

An example pseudocode implemented by the IRFI component for transforming market data to configure data packets/data packages (e.g., contracts) with round units of risk size unit or forward exposure is provided below:

```
Sub set benchmark datapackages ( )
for tenor=2, 5, 7, 10 and 30
For maturity=3 month, 6 month, 1 year and 2 year
for contract type=Treasury and Swaps
set package as contract type, tenor, matarity
return package
End Sub
Sub compute round risk nit size(datapackage)
get package
compute dv01 at zero coupon and zero yield for each
    package
sit forward exposure for each package
return forward exposure for each package
End Sub
Sub Add contracts to platform( )
For all packages in benchmark datapackages
Set combination pairs
End For
For all combination pairs
Set nedgeratio as call compute round risk unit size (pack-
    age1)/call comp compute round risk unit size (pack-
    age2)
End For
Return contracts as combination pair package, hedge ratio
End Sub
Cell Add contracts to platform
```

Distributed IRFIs

The structure and/or operation of any of the IRFI node controller components may be combined, consolidated, and/ or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the IRFI controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage, (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yace, XML, and/or the like, which allow for grammar generation and parsing capabilities, which in turn may form the basis of communication messages within and between components.

For example, a grammar may be arranged to recognize the tokens of an HTTP post command, e.g.:
w3C-post http:// . . . Value1
where Value1 is discerned as being a parameter because "http://" is part of the grammar syntax, and what follows is considered part of the post value. Similarly, with such a grammar, a variable "Value" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the IRFI controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header ('Content-Type: text/plain');
// set ip address and port to listen to for incoming data
$address='192.18.0.100';
$port=255;
// create a server-side SSL socket, listen for/accept incoming communication
$sock=socket_create(AF_INET, SOCK_STREAM, D);
socket_bind($sock, $address, $port) or die('Could not bind to address');
socket_listen($sock);
$client=socket_accept($sock);
// read input data from client device in 1024 byte blocks until end of massages do {
    $input=" ";
    $input=socket_read($client, 1024);
    $data=$input;
} while($input !=" ");
// parse data to extract variables
$obj=json_decode($data, true);
// store input data in a database
mysql_connect ("201.408.185.132", $DBserver,$password); // access database server
mysql_select ("CLIENT_DB.SQL"); // select database to append
mysql_query ("INERT INTO UserTable (transmission) VALUES ($data)"); // add data to UserTable table in a CLIENT database
mysql_close("CLIENT_08.SL,"); // close connection to database
?>
```

Also, the following resources may be used to provide example embodiments regarding SOAP parser implementation:

http://www.xav.com/perl/site/lib/3GAP/Parsser.html
http://public.boulder.ibm.com/infocenter/tivihelp/v2r1/index.jsp?topic=/com.ibm.IBMDI.doc/raferencequide295.htm
and other parser implementations:
http://publib.boulder.ibm.com/infocenter/tivihelp/v2r1/index.jsp?topic=/com.ibm.IBMDI.doc/referenceguide259.htm
all of which are hereby expressly incorporated by reference herein.

Figure 8:
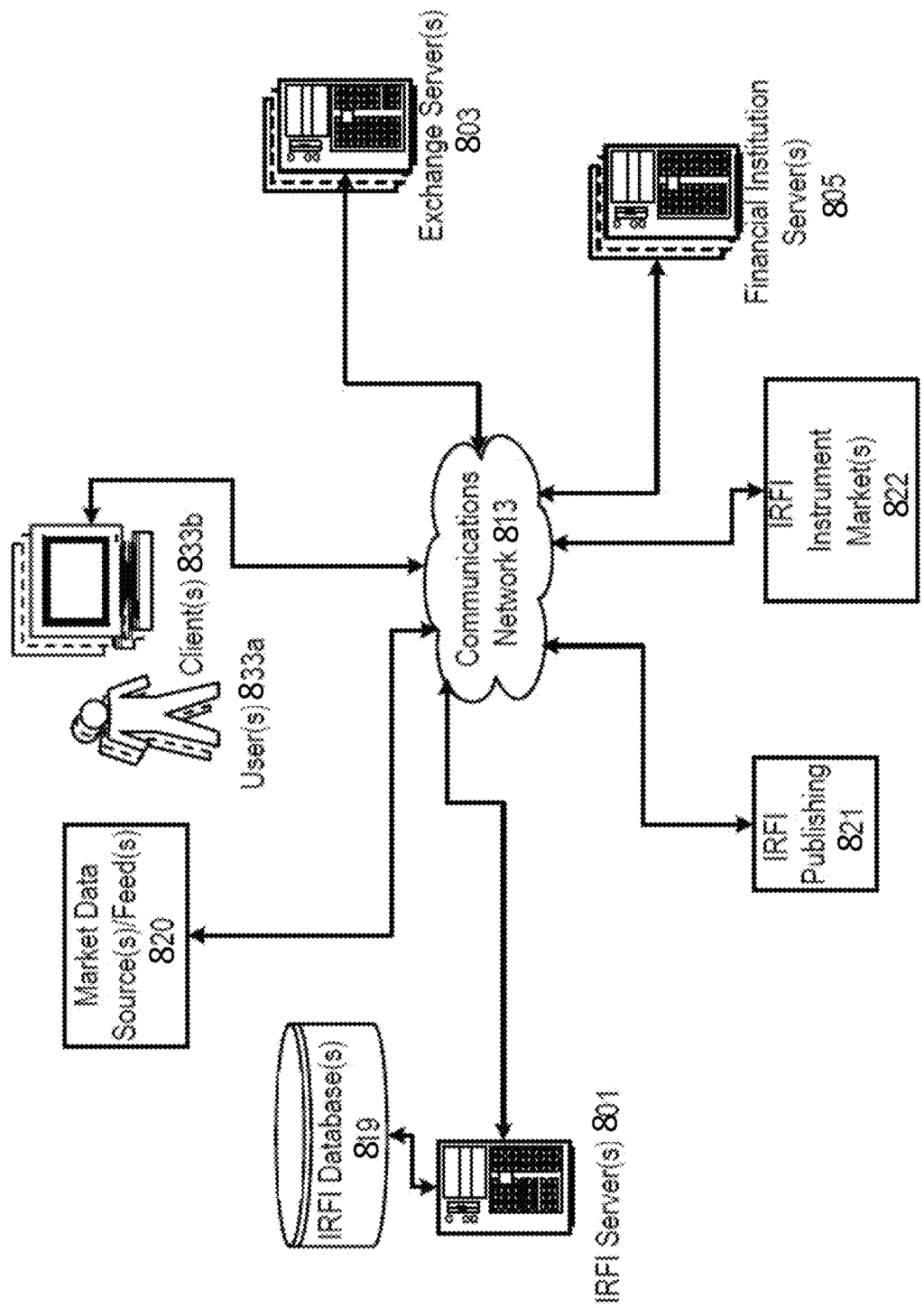
FIG. 8 is a schematic diagram illustrating data flows between IRFI components and associated entities for an embodiment of the IRFI.

FIG. 8 is a schematic diagram illustrating data flows between IRFI components and associated entities for an embodiment of the IRFI. In one implementation, the IRFI comprises one or more IRFI servers 801 implementing IRFI functionality and communicatively coupled to one or more IRFI databases 819, configured to store IRFI and associated data. The IRFI server 801 may also be coupled by a communication network 813 to one or more market data sources and/or market data feeds 120 (e.g., Bloomberg, Bloomberg's PhatPipe, Dun & Bradstreet, Reuters, etc.) to request and/or receive financial data used in the calculation, determination, generation, management, settlement, maintenance, and/or associated activities for the IRFI. A wide variety of different data may be received and/or requested, including but not limited to stock, derivative, security and/or other market data, specific pricing, exposure, and/or the like data for individual securities and/or financial products, sets or portfolios of securities and/or financial products, and/or the like. The IRFI and/or associated systems/sub-systems and/or components/sub-components may process such market information to determine, calculate, generate, facilitate, and/or execute transactions, Such market information may also be utilized by the IRFI to generate, manage, oversee, promote, distribute, sell, buy, write, market, settle, trade, and/or maintain financial products/instruments. As such, depending on the implementation, IRFI server(s) may communicate with clients/users 833a/833b, publishing systems, entities, organizations, and/or components 821, exchange servers 803 (e.g., for exchange entities, securities marketplaces, regulators, etc.), financial institution servers 805 (e.g., for banks, brokerage houses, etc.), and/or a variety of markets 822.

Figure 9:
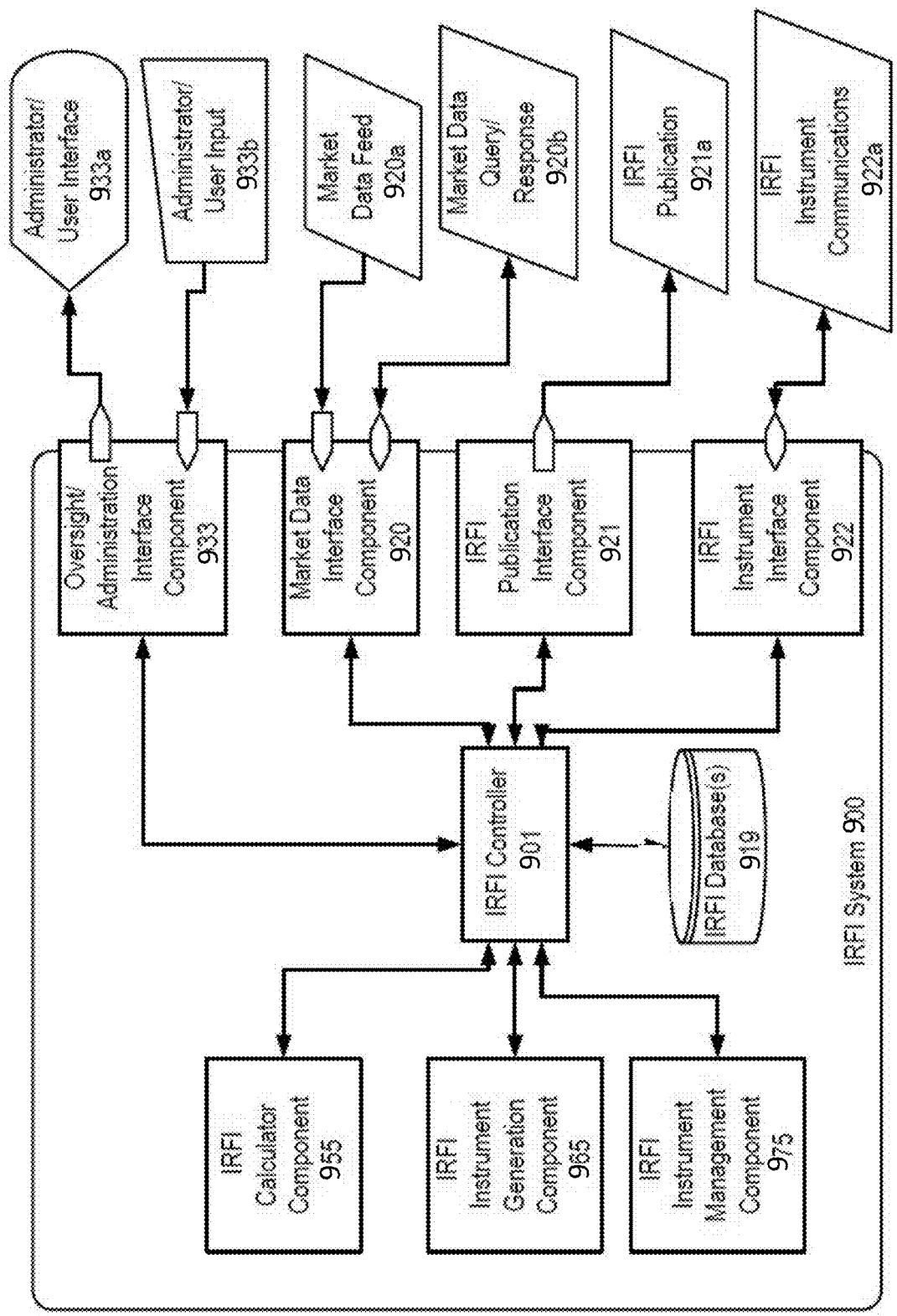
FIG. 9 illustrates aspects of IRFI system architecture in block-diagram form and data flow between and among various IRFI system components for operation of one embodiment of the IRFI.

FIG. 9 illustrates aspects of IRFI system architecture in block-diagram form and data flow between and among various IRFI system components for operation of one embodiment of the IRFI. An IRFI system 900 may include a number of functional/operational modules and/or data stores configured to carry out various IRFI features and/or functionality. A IRFI controller 901 may serve a central role in some embodiments of IRFI operation, orchestrating the reception, determination, generation, transmission and/or distribution of data and/or instructions to, from and between IRFI modules and/or allow further utilization and/or analysis of data generated and/or collected during IRFI operation, and/or storage of data in one or more databases 919. The IRFI controller 901 may be coupled to one or more operational modules configured to implement various features associated with aspects of IRFI operation.

In one implementation, the IRFI controller 901 may be coupled to a market data interface component 920 configured to query and/or receive market data from one or more market data sources 920a and/or feeds 920b, and/or the like.

In one implementation, the IRFI controller 901 may be coupled to a calculator component 955 that processes received and/or stored data (e.g., received via the market data interface component 920 and/or stored in the database(s) 919) to determine/calculate one or more IRFI products.

In some implementations, the calculator component 955 can include an artificial neural network trained to calculate a exposure offsetting amount and/or a delivery amount for a contract. Such an artificial neural network can be, for example, a multi-layer perceptron feedforward artificial neural network. The neural network can include three or more layers, with at least one input layer, a hidden layer and an output layer. The input layer can receive one or more of a value representing a basis point for a contract, a number of contracts to cover a exposure in an auction, pricing data, settlement yield values, and/or delivery price values. The hidden layer(s) can map the values received through the input layer via one or more nonlinear functions to generate IRFI data packages, included but not limited to a exposure offsetting amount and/or a delivery amount for a contract.

Alternatively, or additionally, the calculator component can include a fuzzy logic inference system, for example, a Mamdani-type fuzzy logic system. The fuzzy logic system can include an inference engine logically coupled to a rule base with rules elicited from previous data samples and/or experts' knowledge. The rules included in the rule base can be utilized to predict and/or calculate a exposure offsetting amount and/or a delivery amount for a contract. The fuzzy logic system can receive one or more of a value representing a basis point for a contract, a number of contracts to cover a exposure in an auction, pricing data, settlement yield values, and/or delivery price values. Thereafter, the system can fuzzyfy the inputs which may trigger, and fire, via the inference engine, one or more rules included in the rulebase. In some implementations, the inference engine outputs one or more fuzzyfy values which are defuzzified by a defuzzifier component to generate IRFI data packages, included but not limited to a exposure offsetting amount and/or a delivery amount for a contract.

In one implementation, the IRFI controller 501 may be coupled to a publication interface component 921 configured to publish, transmit, communicate, distribute, etc., IRFI information 921a (e.g., IRFI values determined by the calculator component 955).

In some implementations, the IRFI controller 901 may be coupled to an instrument interface component 922 configured to distribute, receive, transmit, respond, generate, monitor, etc., information pertaining to IRFI instruments 922a, for example, to effectuate and/or monitor instrument transactions and/or the like (e.g., with an exchange server 803).

In one implementation, the IRFI controller 901 may further be coupled to an oversight/administration interface component 933 configured to communicate and/or provide a user interface 933a through which an administrator can monitor and/or interact 933b with IRFI system parameters and settings, data management, access controls, and/or the like.

In some implementations, the IRFI controller 901 may be coupled to an IRFI instrument generation component 965 and/or instrument management component 975 that process determined IRFI information and/or other stored/received data (e.g., received via the instrument interface component 922 and/or stored in the database(s) 919) to generate IRFI instruments and/or associated information and/or facilitate the management of the same. Depending on the implementation, the IRFI and/or associated components may generate and/or manage a variety of IRFI-based financial data packages/instruments.

According to some embodiments, the IRFI comprises or provides an interest based instrument exchange apparatus that includes a processor, a memory storing processor-readable instructions, the processor-readable instructions being executable by the processor to: instantiate a trading platform; receive a user selection of a contract including characteristic parameters associated with the contract; receive a user-selected number of contracts to trade associated with a basis point for the contract; determine a exposure offsetting amount based on the basis point for the contract and the user selected number of contracts to cover a exposure in an auction; receive pricing data from an auction system, including a settlement yield and a delivery price; determine a delivery amount for the contract based on the pricing data; and facilitate a transaction of the delivery amount. In some embodiments, the contract is traded based on units of forward exposure or Dollar Value of a basis point without a fixed notional value. This keeps the actual quantity in line with the forward exposure during the life of the Interest Rate Based Financial instrument (IRBFI). This holds the price movement associated with the change in yield constant, without the need to execute a complex yield-to-price calculation which is an iterative process and takes multiple attempts. The IRFI thereby increases speed and efficiency in trading. By contrast, other products require calculations of Net Present Values, over an interpolated yield curve in order to determine the price of a product and thereby it's change to a change in yield. The IRFI provides an elegant solution of, for example, 100-yield to calculate a price while constantly keeping the forward exposure in line with the notional value during the life of the IRBFI.

In some embodiments of the IRFI, the settlement of the transaction can be or is determined by the corresponding Treasury Auction rather than requiring a separate calculation or methodology to derive the final settlement. This eliminates the ability of manipulation, while forcing convergence to the underlying security and saves time. Again, with the solution provided by the IRFI, there is no need for additional system calculations. In some implementations, active treasury futures are traded after an auction and the coupon established, the IRFI or associated IRBFI permits trading in future treasury Auctions in an elegant manner where the coupon has not as yet been established.

In some embodiments, the IRBFI is in round units of exposure, inter-relationships or spread trading (ST) is in logical fixed ratios and is constant. By contrast, Current Tick values on available contracts that are calculated off of the notional can create odd or awkward increments. The Fed Funds value for example is 41.67 since it is a monthly rate on a $5 mm. This creates difficult ratios when spread versus Eurodollars or Treasury Bonds. According to some embodiments of the IRFI, the IRBFI exposure of a basis point movement is fixed, not variable, making the ratios constant. Accordingly, then can be hard coded, and no longer require complex calculations or valuations (and the associated computation requirements. The IRFI thereby facilitates spread trading (ST) in yield or price elegant and straightforward (and again, reduces required computations and computer communications. Thus, algorithms are no longer required to make constant adjustments or be fine tuned to transact. Current Treasury basket futures require modeling and analytics, yet since the actual deliverable is unknown, it can not truly trade in yield. Therefore, yield spreads are not possible and weighted dollar price spreads are used to execute spread transactions. These weighted dollar spreads do not account for accruals and do not provide historic references.

In one embodiment, the IRFI may provide a method of increasing processor efficiency for a multi-server trading system providing interest-based instrument exchange, the method comprising: instantiating a trading platform on a first server; receiving a user selection of a contract from a second server, the selection including characteristic parameters associated with the contract; receiving a user-selected number of contracts to trade associated with a basis point for the contract from the second server; determining, via the first server, a exposure offsetting amount based on the basis point for the contract and the user selected number of contracts to over a exposure in an auction; receiving pricing data from a third server associated with an auction system, the pricing data including a settlement yield and a delivery price; determining a delivery amount for the contract based on the received pricing data at the first server; and facilitating a transaction of the delivery amount. In some embodiments, the contract is traded based on units of forward exposure or Dollar Value of a basis point without a fixed notional value. This keeps the actual quantity in line with the forward exposure during the life of the Interest Rate Based Financial Instrument (IRBFI), This holds the price movement associated with the change in yield constant, without the need to execute a complex yield-to-price calculation which is an iterative process and takes multiple attempts. The IRFI thereby increases speed and efficiency in trading. By contrast, other products require calculations of Net Present Values, over an interpolated yield curve in order to determine the price of a product and thereby it's change to a change in yield. The IRFI provides an elegant solution of, for example, 100-yield to calculate a price while constantly keeping the forward exposure in line with the notional value during the life of the IRBFI.

In some embodiments, the IRFI allows end users to transact and offset using logical benchmarks. The IRFI provides an instrument that is non-complex to trade and straightforward to transact. The IRFI can provide an instrument that concentrates liquidity even out into the future and where the exposure is always known and transparency is inherent.

In some embodiments, the IRFI provides treasury interest rate exposure futures that allow for trades in yield. In some implementations, price is simply too-yield and each basis point is a round unit of "Exposure" or DV01. In some embodiments of the IRFI, the treasury interest rate exposure futures trades and settles over standard exchange platforms using existing infrastructure and permits trading 3 mo, 6 mo, 9 mo and even years out into the future, depending on the implementation. The treasury interest rate exposure futures can settle to Quarterly Treasury Auctions.

An example of treasury interest rate exposure futures according to one embodiment of the IRFI follows: (1) to year treasury interest rate exposure futures are long dated listed futures or standardized forward contracts on the U.S. Treasury quarterly 10 year Refunding Auctions. (2) Unlike the cash market, treasury interest rate exposure futures can trade years out into the future. (3)Quoting is in yield. The price is simply (100-yield). (4) Each basis point will equal a round fixed dollar value of $100. (5) Offsetting $100,000.00 of exposure per basis point would simply require 1,000 contracts. (5) The settlement yield and delivery price is determined by the corresponding Treasury Auction. (6) The notional delivery amount in millions is calculated as follows:
(# of Contracts*$100)/Dollar Value of a Basis Point per million of the new WI bond.

The IRFI can net trades to a single position, thereby providing efficiencies not available to OTC swaps and MAC swaps.

Figure 10:
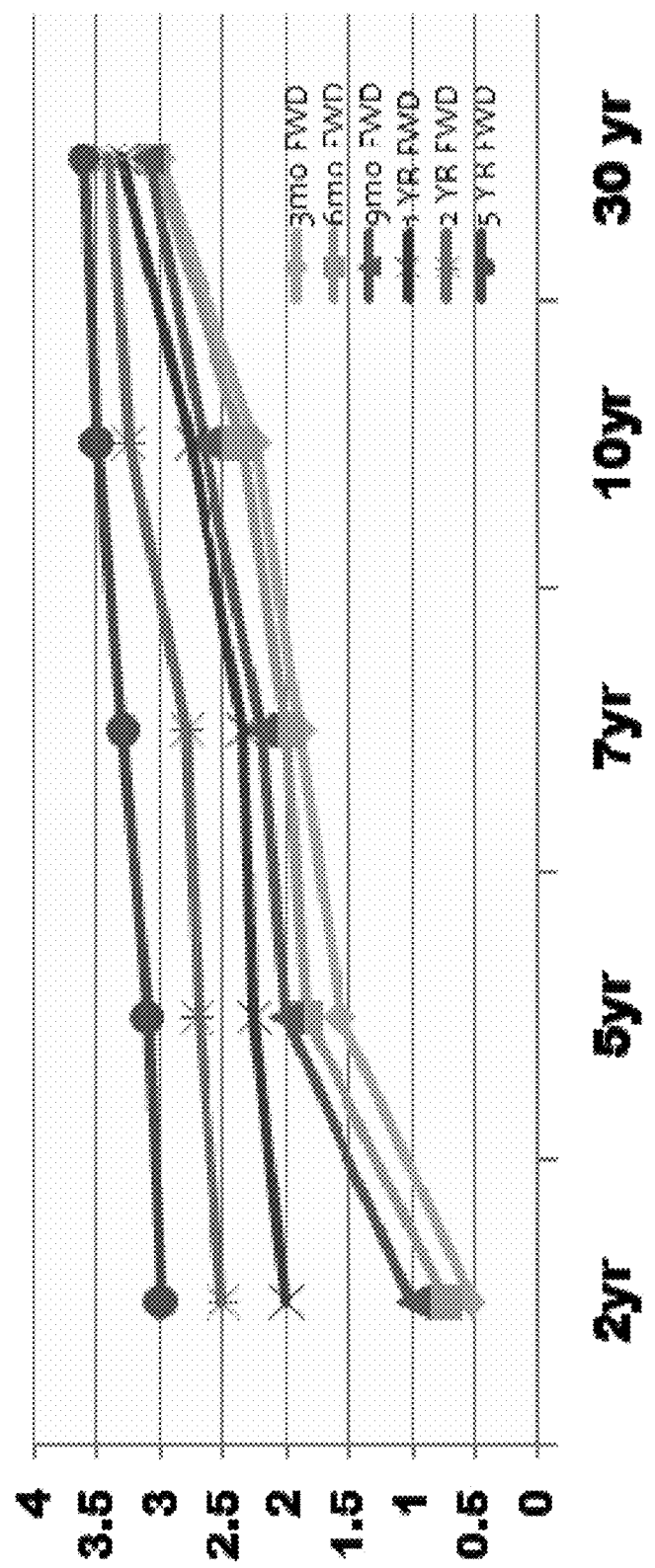
FIG. 10 illustrates multi-curve benchmark rates for some embodiments of the IRFI.

According to some embodiments of the IRFI, interest rate exposure futures provide the ability to trade benchmark rates out into the future, on multiple curves, as shown in the chart in FIG. 10.

The following is an example use case for the IRFI: An investor believes 10 year rates will drift higher into the new auction supply. He or she decides to exposure $100,000 per basis point that rates will move higher. The investor sells 1,000 contracts of the 10 year treasury interest rate exposure futures at 3.00% at a price of 97.00. 1000 contracts*$100=$100,000 in Exposure per basis point. That day the treasury interest rate exposure futures settles at 3.01%, new price=96.99, for a profit of 1 basis point on a mark-to-market. On Day 2, the investor decides to cover his or her short in the underlying Bond Auction. Since rates are close to 3%, he or she can calculates the DV01 to be 833 per million. Taking his $100,000 in exposure, he or she divides it by the DV01 per million of the new WI and determines he or she needs 120 million in bonds to bid. The Auction comes at 3.06%. The investor earns an additional $500,000 (5 basis points*1,000 contracts*$100) as his or her short position settles there. The investor's short futures position produces an obligation of a 120 mm sale at 3.06% on the WI, which is neatly netted versus his purchase of 120 mm at 3.06% in the Auction.

The following is an example use case for the IRFI illustrating an option trade: On Day 1, an investor believes the FED is behind the curve and decides rates will move higher, only this time he wants to limit his exposure to $100,000. He buys 500 put option contracts of the 10 year treasury interest rate exposure futures at 3.25% (a price of 96.75) with a 6 month expiration for a premium of 2 basis points. His cost is 500 contracts*2 basis points*$100 for a total premium of $100,000. His breakeven is 96.73. On Day 2, the market sells off sharply and the option price moves from 2 basis points to 4. The investor has a mark-to-market profit of $100,000. The investor can either hold his position into option expiration and become short 500 futures at 97.75, or he can realize the profit by closing out the transaction at 4 basis points. The investor was able to make a option transaction on a 10 year rate, 6 months forward, in an extremely elegant and efficient format. As can be seen, trading systems implementing the IRFI can benefit from the simplified calculations and reduced bandwidth required.

In order to address various issues and advance the art, the entirety of this application (including the Cover Page, Title, Headings, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented to assist in understanding and teach the claimed principles.

It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various inventive concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently claimed. Applicant reserves all rights in those unclaimed innovations including the right to claim such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list. "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

All examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a IRFI individual and/or enterprise user, database configuration and/or relational model, data type, data transmission and/or network framework, syntax structure, and/or the like, various embodiments of the IRFI may be implemented that allow a great deal of flexibility and customization. For example, aspects of the IRFI may be adapted for data network bandwidth management. While various embodiments and discussions of the IRFI have been directed to financial instrument and derivative construction, trading, and management, however, it is to be understood that the embodiments described herein may be readily configured and/or customized for a wide variety of other applications and/or implementations.

The invention claimed is:

1. An apparatus, comprising:
a plurality of processors;
a calculator subcomponent including an artificial neural network, the artificial neural network having at least three layers, the at least three layers including:
   at least one input layer configured to receive one or more data packet indicia,
   a hidden layer configured to map the one or more data packet indicia received through the input layer via one or more nonlinear functions, and
   an output layer; and
a memory in communication with the plurality of processors and calculator subcomponent, the memory storing processor-readable instructions, the processor-readable instructions being executable to, without iterative yield-to-price calculations:
   instantiate a data exchange platform;
   receive an encrypted secure data packet selection;
   decrypt the encrypted secure data packet selection to determine a plurality of data packet parameters associated with the encrypted secure data packet selection, the secure data packet selection representing an interest rate exposure future without a fixed notional value;
   receive a data packet exchange quantity string associated with a data packet basis point (BP) metric, the data packet BP metric being from the plurality of data packet parameters;
   calculate, via the calculator subcomponent, an offset metric based on the data packet BP metric and the data packet quantity string to correspond to an exposure value (EV) in a data exchange without iterative price-to-yield (PtY) calculations;

receive a pricing value (PV) string from the data exchange the PV string including a settlement yield (SY) metric and delivery price (DP) metric, a data packet delivery quantity (DQ) determined based on the PV string without a separate calculation to determine the DQ; and execute a secure exchange of the DQ.

2. A computer-implemented method of providing communication system security and processor efficiency across a multi-server data exchange system having an artificial neural network that provides validated interest-rate-based instrument (IBI) communications and data exchanges, the method comprising:

instantiating a data exchanger on a first computer server;

receiving an encrypted identifier of a data packet at the first computer server over a secure communication network from a second computer server, the encrypted identifier encrypted at the second computer server;

decrypting the encrypted identifier at the first computer server to determine a plurality of data packet parameters associated with the data packet, the data packet representing an IBI without a fixed notional value (NV);

securely receiving at the first computer server a specified data packet quantity string from the second computer server, the specified data packet quantity string associated with a basis point (BP) value of the data packet;

calculating an offset value based on the BP value of the data packet and the specified data packet quantity string to correspond to an exposure value (EV) in a data exchange;

receiving a pricing value (PV) string at the first computer server over a secure network from a third computer server associated with a data exchange system, the PV string including a settlement yield (SY) value and a delivery price (DP) value;

determining a delivery quantity (DQ) for the data packet based on the PV string at the first computer server without using a separate calculation to determine the DQ; and facilitating a secure exchange of the DQ, the data packet exchanged based on forward exposure (FE) units or dollar value (DV) of a BP without a fixed NV such that actual quantity of a data packet exchanged corresponds to the FE units, the method performed without iterative price-to-yield (PtY) calculations.

3. The computer-implemented method of claim 2, wherein a price movement (PM) associated with a change of yield (dY) is held constant.

4. The computer-implemented method of claim 2, wherein IBIs are provided in round units such that spread trading (ST) is in fixed ratios.

5. The computer-implemented method of claim 2, wherein IBI exposure of BP change is fixed.

6. A secure, high-efficiency multi-server data packet communication, validation, and exchange apparatus, comprising:

a plurality of processors;

a memory in communication with the plurality of processors and storing processor-readable instructions, the processor-readable instructions being executable by the plurality of processors to, without iterative yield-to-price calculations:

instantiate a data exchange platform;

receive a secure data packet selection including a plurality of data packet parameters including a data packet basis point (BP) metric, an indication of forward exposure (FE) units, and a delivery price (DP) of a dollar value (DV) of a basis point (BP) without a set quantity;

receive a data packet quantity string to exchange, the data packet quantity string associated with the BP metric;

calculate, based on the data packet BP metric and the data packet quantity string, an offset metric to correspond to an exposure value (EV) in a data exchange system;

receive a pricing value (PV) string from the data exchange system, the PV string including a settlement yield (SY) metric and a delivery price (DP) metric;

determine a delivery quantity (DQ) based on the PV string without a separate calculation to determine the DQ; and execute a secure exchange of the DQ.

7. The apparatus of claim 6, wherein a value at exposure of the contract (VALX) of the data packet is a product of a number of data packets, a volatility in basis points (VOLBP), and an exposure unit (EU).

8. The apparatus of claim 6, further comprising a calculator component.

9. The apparatus of claim 8, wherein the calculator component includes an artificial neural network.

10. The apparatus of claim 9, wherein the artificial neural network is trained to calculate the offset metric and/or the DQ.

11. The apparatus of claim 9, wherein the artificial neural network is a multi-layer perceptron feedforward artificial neural network.

12. The apparatus of claim 9, wherein the artificial neural network includes at three or more layers, with at least one input layer, at least one a hidden layer, and at least one output layer.

13. The apparatus of claim 12, wherein the at least one input layer is configured to receive at least one data packet indicia.

14. The apparatus of claim 13, wherein the at least one data packet indicia is a data packet BP.

15. The apparatus of claim 13, wherein the at least one hidden layer is configured to map the at least one data packet indicia received through the input layer via one or more nonlinear functions to generate at least one data packet parameter that is included in the plurality of data packet parameters.

16. The apparatus of claim 15, wherein the at least one data packet parameter includes the offset metric.

* * * * *